(12) United States Patent
Li et al.

(10) Patent No.: US 12,355,982 B2
(45) Date of Patent: Jul. 8, 2025

(54) DECODER-SIDE CHROMA INTRA PREDICTION MODE GRADIENT-BASED DERIVATION

(71) Applicant: Alibaba (China) Co., Ltd., Hangzhou (CN)

(72) Inventors: Xinwei Li, Beijing (CN); Ru-Ling Liao, Beijing (CN); Jie Chen, Beijing (CN); Yan Ye, San Diego, CA (US)

(73) Assignee: Alibaba (China) Co., Ltd, Hangzhou (CN)

( * ) Notice: Subject to any disclaimer, the term of this patent is extended or adjusted under 35 U.S.C. 154(b) by 201 days.

(21) Appl. No.: 18/091,178

(22) Filed: Dec. 29, 2022

(65) Prior Publication Data

US 2023/0217030 A1    Jul. 6, 2023

Related U.S. Application Data

(60) Provisional application No. 63/315,957, filed on Mar. 2, 2022, provisional application No. 63/296,482, filed on Jan. 4, 2022.

(51) Int. Cl.
*H04N 19/159*     (2014.01)
*H04N 19/11*      (2014.01)
(Continued)

(52) U.S. Cl.
CPC ........... *H04N 19/159* (2014.11); *H04N 19/11* (2014.11); *H04N 19/117* (2014.11); *H04N 19/13* (2014.11);
(Continued)

(58) Field of Classification Search
CPC ...... H04N 19/11; H04N 19/117; H04N 19/13; H04N 19/132; H04N 19/159;
(Continued)

(56) References Cited

U.S. PATENT DOCUMENTS

2015/0281687 A1    10/2015  Yasugi et al.
2020/0014920 A1*   1/2020   Zhao .................... H04N 19/146
(Continued)

FOREIGN PATENT DOCUMENTS

EP          3654645 A1     5/2020
WO     WO2021052494 A1    3/2021

OTHER PUBLICATIONS

International Search Report mailed Mar. 22, 2023, from PCT/CN2023/070246, 4 pages.
(Continued)

*Primary Examiner* — Shahan Ur Rahaman
(74) *Attorney, Agent, or Firm* — Lee & Hayes, P.C.

(57) ABSTRACT

A VVC-standard encoder and a VVC-standard decoder are provided, implementing a decoder-side chroma intra prediction mode gradient-based derivation method, which improves coding efficiency of chroma intra prediction, thereby saving on signaling cost. A VVC-standard decoder configures one or more processors of a computing system to derive one of multiple possible chroma intra prediction modes by computing gradients of adjacent luma samples and chroma samples of a current chroma block. With minimal increase in signaling cost, the VVC-standard coding and decoding processes are enhanced to base intra prediction modes for chroma blocks on collocated luma block-adjacent reconstructed luma samples adjacent reconstructed chroma samples, enabling prior computational work done on coding and decoding adjacent blocks to be referenced. In this fashion, coding gains can be achieved in matching texture characteristics of the current chroma block based on a texture gradient including adjacent blocks.

18 Claims, 11 Drawing Sheets

(51) Int. Cl.
  *H04N 19/117* (2014.01)
  *H04N 19/13* (2014.01)
  *H04N 19/132* (2014.01)
  *H04N 19/176* (2014.01)
  *H04N 19/186* (2014.01)
  *H04N 19/593* (2014.01)
  *H04N 19/70* (2014.01)

(52) U.S. Cl.
  CPC ......... *H04N 19/132* (2014.11); *H04N 19/176* (2014.11); *H04N 19/186* (2014.11); *H04N 19/593* (2014.11); *H04N 19/70* (2014.11)

(58) Field of Classification Search
  CPC .. H04N 19/176; H04N 19/186; H04N 19/593; H04N 19/70
  See application file for complete search history.

(56) References Cited

U.S. PATENT DOCUMENTS

| | | | |
|---|---|---|---|
| 2020/0128272 A1 | 4/2020 | Jangwon et al. | |
| 2021/0329259 A1 | 10/2021 | Huo et al. | |
| 2022/0070451 A1* | 3/2022 | Abdoli | H04N 19/14 |
| 2022/0150479 A1* | 5/2022 | Rosewarne | H04N 19/96 |

OTHER PUBLICATIONS

Written Opinion mailed Mar. 22, 2023, from PCT/CN2023/070246, 3 pages.

\* cited by examiner

DECODER-SIDE CHROMA INTRA PREDICTION MODE GRADIENT-BASED DERIVATION

RELATED APPLICATIONS

This application claims the benefit of U.S. Patent Application No. 63/296,482, entitled "DECODER-SIDE CHROMA INTRA PREDICTION MODE DERIVATION IN NEXT-GENERATION VIDEO CODING" and filed Jan. 4, 2021, and claims the benefit of U.S. Patent Application No. 63/315,957, entitled "DECODER-SIDE CHROMA INTRA PREDICTION MODE DERIVATION IN NEXT-GENERATION VIDEO CODING" and filed Mar. 2, 2022, each of which is expressly incorporated herein by reference in its entirety.

BACKGROUND

In 2020, the Joint Video Experts Team ("JVET") of the ITU-T Video Coding Expert Group ("ITU-T VCEG") and the ISO/IEC Moving Picture Expert Group ("ISO/IEC MPEG") published the final draft of the next-generation video codec specification, Versatile Video Coding ("VVC"). This specification further improves video coding performance over prior standards such as H.264/AVC (Advanced Video Coding) and H.265/HEVC (High Efficiency Video Coding). The JVET continues to propose additional techniques beyond the scope of the VVC standard itself, collected under the Enhanced Compression Model ("ECM") name.

According to the HEVC and VVC standards, the luma component can be predicted by multiple intra prediction modes, including angular intra prediction, a directional intra prediction method. To capture the arbitrary edge directions presented in natural video, the VVC standard extends the number of angular intra prediction modes provided by the HEVC standard.

Moreover, at time of writing, the latest draft of ECM (presented at the 140th meeting of the Moving Picture Experts Group ("MPEG") in October 2022 as "Algorithm description of Enhanced Compression Model 7 (ECM 7)") includes proposals to further implement intra prediction modes, including angular intra prediction modes beyond those provided by the VVC standard.

However, according to both VVC and ECM's implementations of intra prediction modes, merely adding ever more angular intra prediction modes to the video codec specification results in increase bits signaled in a bitstream. Additionally, ECM provides more intra prediction modes available for luma blocks than chroma blocks, reducing accuracy of Direct Mode. It is difficult to match the texture characteristics of the current chroma block for very small luma blocks.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In accordance with the VVC video coding standard (the "VVC standard") and motion prediction as described therein, a computing system includes at least one or more processors and a computer-readable storage medium communicatively coupled to the one or more processors. The computer-readable storage medium is a non-transient or non-transitory computer-readable storage medium, as defined subsequently with reference to FIG. 12, storing computer-readable instructions. At least some computer-readable instructions stored on a computer-readable storage medium are executable by one or more processors of a computing system to configure the one or more processors to perform associated operations of the computer-readable instructions, including at least operations of an encoder as described by the VVC standard, and operations of a decoder as described by the VVC standard. Some of these encoder operations and decoder operations according to the VVC standard are subsequently described in further detail, though these subsequent descriptions should not be understood as exhaustive of encoder operations and decoder operations according to the VVC standard. Subsequently, a "VVC-standard encoder" and a "VVC-standard decoder" shall describe the respective computer-readable instructions stored on a computer-readable storage medium which configure one or more processors to perform these respective operations (which can be called, by way of example, "reference implementations" of an encoder or a decoder).

Moreover, according to example embodiments of the present disclosure, a VVC-standard encoder and a VVC-standard decoder further include computer-readable instructions stored on a computer-readable storage medium which are executable by one or more processors of a computing system to configure the one or more processors to perform operations not specified by the VVC standard. A VVC-standard encoder should not be understood as limited to operations of a reference implementation of an encoder, but including further computer-readable instructions configuring one or more processors of a computing system to perform further operations as described herein. A VVC-standard decoder should not be understood as limited to operations of a reference implementation of a decoder, but including further computer-readable instructions configuring one or more processors of a computing system to perform further operations as described herein.

Figure 1A:
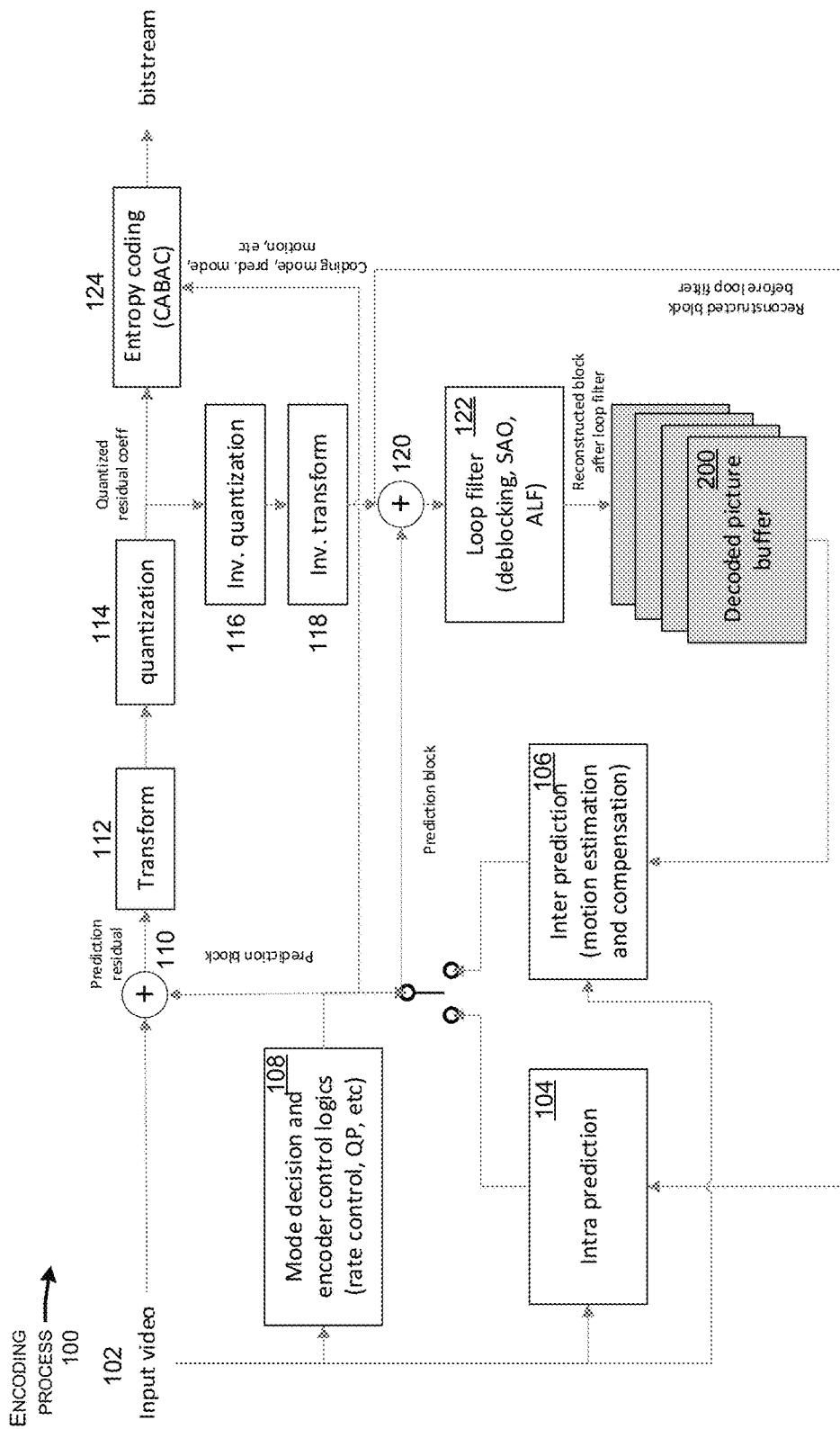
FIGS. 1A and 1B illustrate example block diagrams of, respectively, a video encoding process and a video decoding process according to example embodiments of the present disclosure.
Figure 1B:
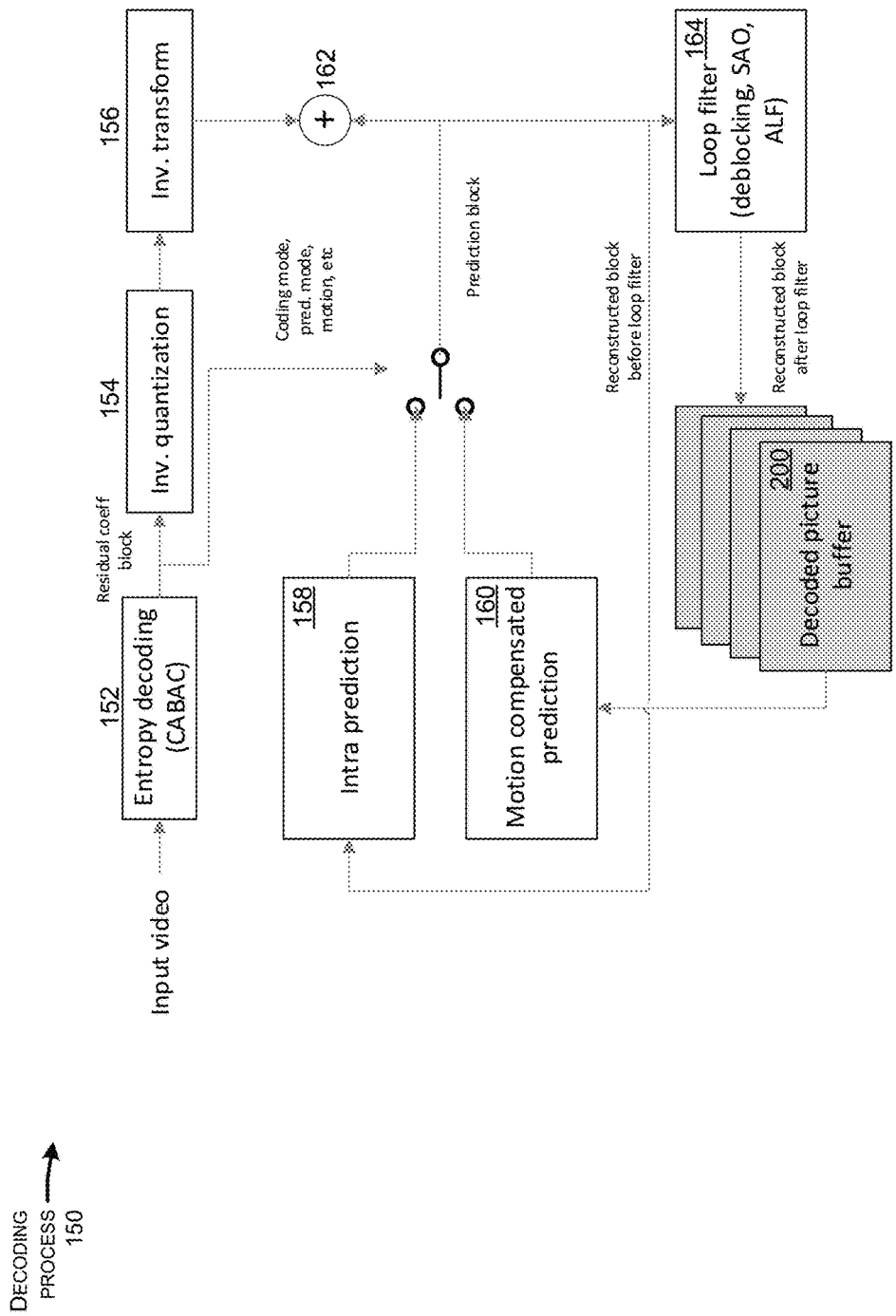

FIGS. 1A and 1B illustrate example block diagrams of, respectively, an encoding process 100 and a decoding process 150 according to an example embodiment of the present disclosure.

In an encoding process 100, a VVC-standard encoder configures one or more processors of a computing system to receive, as input, one or more input pictures from an image source 102. An input picture includes some number of pixels sampled by an image capture device, such as a photosensor array, and includes an uncompressed stream of multiple color channels (such as RGB color channels) storing color data at an original resolution of the picture, where each channel stores color data of each pixel of a picture using some number of bits. A VVC-standard encoder configures one or more processors of a computing system to store this uncompressed color data in a compressed format, wherein color data is stored at a lower resolution than the original resolution of the picture, encoded as a luma ("Y") channel and two chroma ("U" and "V") channels of lower resolution than the luma channel.

A VVC-standard encoder encodes a picture (a picture being encoded being called a "current picture," as distinguished from any other picture received from an image source 102) by configuring one or more processors of a computing system to partition the original picture into units and subunits according to a partitioning structure. A VVC-standard encoder configures one or more processors of a computing system to subdivide a picture into macroblocks ("MBs") each having dimensions of 16×16 pixels, which may be further subdivided into partitions. A VVC-standard encoder configures one or more processors of a computing system to subdivide a picture into coding tree units ("CTUs"), the luma and chroma components of which may be further subdivided into coding tree blocks ("CTBs") which are further subdivided into coding units ("CUs"). Alternatively, a VVC-standard encoder configures one or more processors of a computing system subdivide a picture into units of N×N pixels, which may then be further subdivided into subunits. Each of these largest subdivided units of a picture may generally be referred to as a "block" for the purpose of this disclosure.

A CU is coded using one block of luma samples and two corresponding blocks of chroma samples, where pictures are not monochrome and are coded using one coding tree.

A VVC-standard encoder configures one or more processors of a computing system to subdivide a block into partitions having dimensions in multiples of 4×4 pixels. For example, a partition of a block may have dimensions of 8×4 pixels, 4×8 pixels, 8×8 pixels, 16×8 pixels, or 8×16 pixels.

By encoding color information of blocks of a picture and subdivisions thereof, rather than color information of pixels of a full-resolution original picture, a VVC-standard encoder configures one or more processors of a computing system to encode color information of a picture at a lower resolution than the input picture, storing the color information in fewer bits than the input picture.

Furthermore, a VVC-standard encoder encodes a picture by configuring one or more processors of a computing system to perform motion prediction upon blocks of a current picture. Motion prediction coding refers to storing image data of a block of a current picture (where the block of the original picture, before coding, is referred to as an "input block") using motion information and prediction units ("PUs"), rather than pixel data, according to intra prediction 104 or inter prediction 106.

Motion information refers to data describing motion of a block structure of a picture or a unit or subunit thereof, such as motion vectors and references to blocks of a current picture or of a reference picture. PUs may refer to a unit or multiple subunits corresponding to a block structure among multiple block structures of a picture, such as an MB or a CTU, wherein blocks are partitioned based on the picture data and are coded according to the VVC standard. Motion information corresponding to a PU may describe motion prediction as encoded by a VVC-standard encoder as described herein.

A VVC-standard encoder configures one or more processors of a computing system to code motion prediction information over each block of a picture in a coding order among blocks, such as a raster scanning order wherein a first-decoded block is an uppermost and leftmost block of the picture. A block being encoded is called a "current block," as distinguished from any other block of a same picture.

According to intra prediction 104, one or more processors of a computing system are configured to encode a block by references to motion information and PUs of one or more other blocks of the same picture. According to intra prediction coding, one or more processors of a computing system perform an intra prediction 104 (also called spatial prediction) computation by coding motion information of the current block based on spatially neighboring samples from spatially neighboring blocks of the current block.

According to inter prediction 106, one or more processors of a computing system are configured to encode a block by references to motion information and PUs of one or more other pictures. One or more processors of a computing system are configured to store one or more previously coded and decoded pictures in a reference picture buffer for the purpose of inter prediction coding; these stored pictures are called reference pictures.

One or more processors are configured to perform an inter prediction 106 (also called temporal prediction or motion compensated prediction) computation by coding motion information of the current block based on samples from one or more reference pictures. Inter prediction may further be computed according to uni-prediction or bi-prediction: in uni-prediction, only one motion vector, pointing to one reference picture, is used to generate a prediction signal for the current block. In bi-prediction, two motion vectors, each pointing to a respective reference picture, are used to generate a prediction signal of the current block.

A VVC-standard encoder configures one or more processors of a computing system to code a CU to include reference indices to identify, for reference of a VVC-standard decoder, the prediction signal(s) of the current block. One or more processors of a computing system can code a CU to include an inter prediction indicator. An inter prediction indicator indicates list 0 prediction in reference to a first reference picture list referred to as list 0, list 1 prediction in reference to a second reference picture list referred to as list 1, or bi-prediction in reference to both reference picture lists referred to as, respectively, list 0 and list 1.

In the cases of the inter prediction indicator indicating list 0 prediction or list 1 prediction, one or more processors of a computing system are configured to code a CU including a reference index referring to a reference picture of the reference picture buffer referenced by list 0 or by list 1, respectively. In the case of the inter prediction indicator indicating bi-prediction, one or more processors of a computing system are configured to code a CU including a first reference index referring to a first reference picture of the reference picture buffer referenced by list 0, and a second reference index referring to a second reference picture of the reference picture referenced by list 1.

A VVC-standard encoder configures one or more processors of a computing system to code each current block of a picture individually, outputting a prediction block for each. According to the VVC standard, a CTU can be as large as 128×128 luma samples (plus the corresponding chroma samples, depending on the chroma format). A CTU may be further partitioned into CUs according to a quad-tree, binary tree, or ternary tree. One or more processors of a computing system are configured to ultimately record coding parameter sets such as coding mode (intra mode or inter mode), motion information (reference index, motion vectors, etc.) for inter-coded blocks, and quantized residual coefficients, at syntax structures of leaf nodes of the partitioning structure.

After a prediction block is output, a VVC-standard encoder configures one or more processors of a computing system to send coding parameter sets such as coding mode (i.e., intra or inter prediction), a mode of intra prediction or a mode of inter prediction, and motion information to an entropy coder 124 (as described subsequently).

The VVC standard provides semantics for recording coding parameter sets for a CU. For example, with regard to the above-mentioned coding parameter sets, pred_mode_flag for a CU is set to 0 for an inter-coded block, and is set to 1 for an intra-coded block; general_merge_flag for a CU is set to indicate whether merge mode is used in inter prediction of the CU; inter_affine_flag and cu_affine_type_flag for a CU are set to indicate whether affine motion compensation is used in inter prediction of the CU; mvp_l0_flag and mvp_l1_flag are set to indicate a motion vector index in list 0 or in list 1, respectively; and ref_idx_l0 and ref_idx_l1 are set to indicate a reference picture index in list 0 or in list 1, respectively. It should be understood that the VVC standard includes semantics for recording various other information, flags, and options which are beyond the scope of the present disclosure.

A VVC-standard encoder further implements one or more mode decision and encoder control settings 108, including rate control settings. One or more processors of a computing system are configured to perform mode decision by, after intra or inter prediction, selecting an optimized prediction mode for the current block, based on the rate-distortion optimization method.

A rate control setting configures one or more processors of a computing system to assign different quantization parameters ("QPs") to different pictures. Magnitude of a QP determines a scale over which picture information is quantized during encoding by one or more processors (as shall be subsequently described), and thus determines an extent to which the encoding process 100 discards picture information (due to information falling between steps of the scale) from MBs of the sequence during coding.

A VVC-standard encoder further implements a subtractor 110. One or more processors of a computing system are configured to perform a subtraction operation by computing a difference between an input block and a prediction block. Based on the optimized prediction mode, the prediction block is subtracted from the input block. The difference between the input block and the prediction block is called prediction residual, or "residual" for brevity.

Based on a prediction residual, a VVC-standard encoder further implements a transform 112. One or more processors of a computing system are configured to perform a transform operation on the residual by a matrix arithmetic operation to compute an array of coefficients (which can be referred to as "residual coefficients," "transform coefficients," and the like), thereby encoding a current block as a transform block ("TB"). Transform coefficients may refer to coefficients representing one of several spatial transformations, such as a diagonal flip, a vertical flip, or a rotation, which may be applied to a sub-block.

It should be understood that a coefficient can be stored as two components, an absolute value and a sign, as shall be described in further detail subsequently.

Sub-blocks of CUs, such as PUs and TBs, can be arranged in any combination of sub-block dimensions as described above. A VVC-standard encoder configures one or more processors of a computing system to subdivide a CU into a residual quadtree ("RQT"), a hierarchical structure of TBs. The RQT provides an order for motion prediction and residual coding over sub-blocks of each level and recursively down each level of the RQT.

A VVC-standard encoder further implements a quantization 114. One or more processors of a computing system are configured to perform a quantization operation on the residual coefficients by a matrix arithmetic operation, based on a quantization matrix and the QP as assigned above. Residual coefficients falling within an interval are kept, and residual coefficients falling outside the interval step are discarded.

A VVC-standard encoder further implements an inverse quantization 116 and an inverse transform 118. One or more processors of a computing system are configured to perform an inverse quantization operation and an inverse transform operation on the quantized residual coefficients, by matrix arithmetic operations which are the inverse of the quantization operation and transform operation as described above. The inverse quantization operation and the inverse transform operation yield a reconstructed residual.

A VVC-standard encoder further implements an adder 120. One or more processors of a computing system are configured perform an addition operation by adding a prediction block and a reconstructed residual, outputting a reconstructed block.

A VVC-standard encoder further implements a loop filter 122. One or more processors of a computing system are configured to apply a loop filter, such as a deblocking filter, a sample adaptive offset ("SAO") filter, and adaptive loop filter ("ALF") to a reconstructed block, outputting a filtered reconstructed block.

A VVC-standard encoder further configures one or more processors of a computing system to output a filtered reconstructed block to a decoded picture buffer ("DPB") 200. A DPB 200 stores reconstructed pictures which are used by one or more processors of a computing system as reference pictures in coding pictures other than the current picture, as described above with reference to inter prediction.

A VVC-standard encoder further implements an entropy coder 124. One or more processors of a computing system are configured to perform entropy coding, wherein, according to the Context-Sensitive Binary Arithmetic Codec ("CABAC"), symbols making up quantized residual coefficients are coded by mappings to binary strings (subsequently "bins"), which can be transmitted in an output bitstream at a compressed bitrate. The symbols of the quantized residual coefficients which are coded include absolute values of the residual coefficients (these absolute values being subsequently referred to as "residual coefficient levels").

Thus, the entropy coder configures one or more processors of a computing system to code residual coefficient levels of a block; bypass coding of residual coefficient signs and record the residual coefficient signs with the coded block; record coding parameter sets such as coding mode, a mode of intra prediction or a mode of inter prediction, and motion information coded in syntax structures of a coded block (such as a picture parameter set ("PPS") found in a picture header, as well as a sequence parameter set ("SPS") found in a sequence of multiple pictures); and output the coded block.

A VVC-standard encoder configures one or more processors of a computing system to output a coded picture, made up of coded blocks from the entropy coder 124. The coded picture is output to a transmission buffer, where it is ultimately packed into a bitstream for output from the VVC-standard encoder. The bitstream is written by one or more processors of a computing system to a non-transient or non-transitory computer-readable storage medium of the computing system, for transmission.

In a decoding process 150, a VVC-standard decoder configures one or more processors of a computing system to receive, as input, one or more coded pictures from a bitstream.

A VVC-standard decoder implements an entropy decoder 152. One or more processors of a computing system are configured to perform entropy decoding, wherein, according to CABAC, bins are decoded by reversing the mappings of symbols to bins, thereby recovering the entropy-coded quantized residual coefficients. The entropy decoder 152 outputs the quantized residual coefficients, outputs the coding-bypassed residual coefficient signs, and also outputs the syntax structures such as a PPS and a SPS.

A VVC-standard decoder further implements an inverse quantization 154 and an inverse transform 156. One or more processors of a computing system are configured to perform an inverse quantization operation and an inverse transform operation on the decoded quantized residual coefficients, by matrix arithmetic operations which are the inverse of the quantization operation and transform operation as described above. The inverse quantization operation and the inverse transform operation yield a reconstructed residual.

Furthermore, based on coding parameter sets recorded in syntax structures such as PPS and a SPS by the entropy coder 124 (or, alternatively, received by out-of-band transmission or coded into the decoder), and a coding mode included in the coding parameter sets, the VVC-standard decoder determines whether to apply intra prediction 156 (i.e., spatial prediction) or to apply motion compensated prediction 158 (i.e., temporal prediction) to the reconstructed residual.

In the event that the coding parameter sets specify intra prediction, the VVC-standard decoder configures one or more processors of a computing system to perform intra prediction 158 using prediction information specified in the coding parameter sets. The intra prediction 158 thereby generates a prediction signal.

In the event that the coding parameter sets specify inter prediction, the VVC-standard decoder configures one or more processors of a computing system to perform motion compensated prediction 160 using a reference picture from a DPB 200. The motion compensated prediction 160 thereby generates a prediction signal.

A VVC-standard decoder further implements an adder 162. The adder 162 configures one or more processors of a computing system to perform an addition operation on the reconstructed residuals and the prediction signal, thereby outputting a reconstructed block.

A VVC-standard decoder further implements a loop filter 164. One or more processors of a computing system are configured to apply a loop filter, such as a deblocking filter, a SAO filter, and ALF to a reconstructed block, outputting a filtered reconstructed block.

A VVC-standard decoder further configures one or more processors of a computing system to output a filtered reconstructed block to the DPB 200. As described above, a DPB 200 stores reconstructed pictures which are used by one or more processors of a computing system as reference pictures in coding pictures other than the current picture, as described above with reference to motion compensated prediction.

A VVC-standard decoder further configures one or more processors of a computing system to output reconstructed pictures from the DPB to a user-viewable display of a computing system, such as a television display, a personal computing monitor, a smartphone display, or a tablet display.

Therefore, as illustrated by an encoding process 100 and a decoding process 150 as described above, a VVC-standard encoder and a VVC-standard decoder each implements motion prediction coding in accordance with the VVC specification. A VVC-standard encoder and a VVC-standard decoder each configures one or more processors of a computing system to generate a reconstructed picture based on a previous reconstructed picture of a DPB according to motion compensated prediction as described by the VVC standard, wherein the previous reconstructed picture serves as a reference picture in motion compensated prediction as described herein.

According to the VVC standard, coding trees are configured to provide separate block tree structures for the luma and chroma components of a picture. A CTU can include three CTBs, these in turn including one luma CTB ("Y") and two chroma CTBs ("Cb" and "Cr").

For P slices and B slices, luma and chroma CTBs of one CTU are configured to share a common coding tree structure. However, for I slices, the luma and chroma CTBs can be configured having separate block tree structures. Given a coding tree configured for separate block trees, a luma CTB is partitioned into CUs by a first coding tree structure, and chroma CTBs are partitioned into chroma CUs by a second coding tree structure.

In other words, while a CU of an I slice may contain a coding block of the luma component or coding blocks of two chroma components, a CU in a P or B slice contains coding blocks of all three color components (unless the video is monochrome).

According to the VVC standard, the luma component can be predicted by multiple intra prediction modes. These include a Planar intra prediction mode; a DC intra prediction mode; an angular intra prediction mode; Multiple Reference Line ("MRL") prediction modes; Intra Sub-partition ("ISP") modes; and Matrix-based Intra Prediction ("MIP") modes. These modes are described in further detail subsequently.

Angular intra prediction is a directional intra prediction method, which is extended from a prior implementation according to the HEVC standard. To capture the arbitrary edge directions presented in natural video, the VVC standard extends the number of angular intra prediction modes from 33 (as used in HEVC) to 65.

Figure 2:
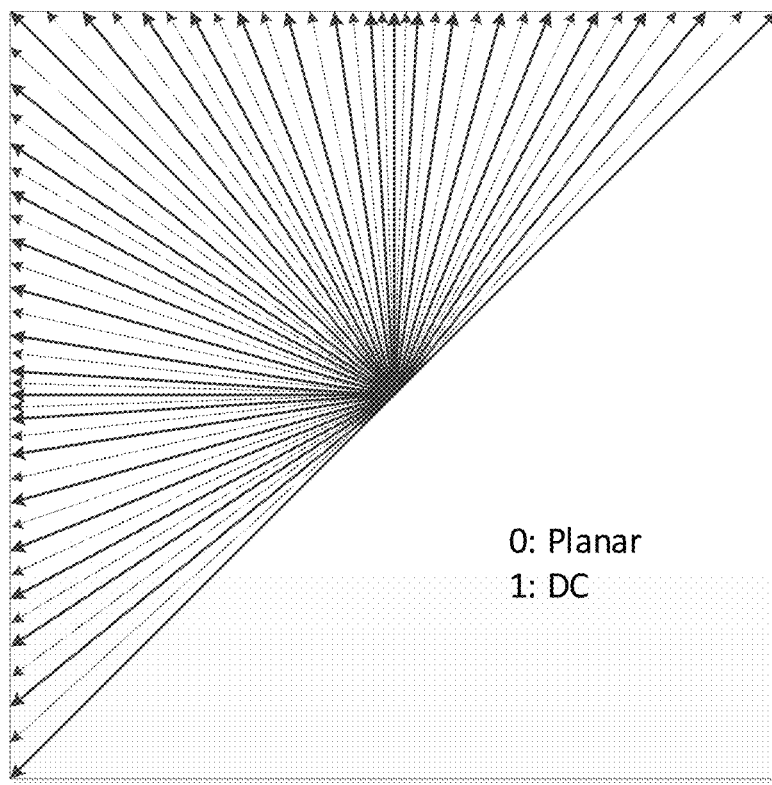
FIG. 2 illustrates angular intra prediction modes according to the VVC standard.

FIG. 2 illustrates angular intra prediction modes according to the VVC standard. The modes added in VVC are illustrated in broken lines.

The VVC standard implements two non-angular intra prediction modes, DC and Planar modes (as in HEVC). The DC intra prediction mode uses the mean sample value of the reference samples to the block for prediction generation. VVC uses the reference samples only along the longer side of a rectangular block to compute the mean value, while for square blocks reference samples from both left and upper sides are used. By a Planar mode, the predicted sample values are obtained as a weighted average of 4 reference sample values. Here, the reference samples in the same row or column as the current sample and the reference samples on the lower-left and on the upper-right position with respect to the block are used.

The VVC standard implements an MRL mode as follows. In addition to the directly adjacent line of neighboring samples, one of the two non-adjacent reference lines can comprise the input for intra prediction.

The VVC standard implements an ISP mode as follows. Luma intra-predicted blocks are divided vertically or horizontally into 2 or 4 sub-partitions depending on the block size. For each sub-partition, the prediction and transform coding operations are performed separately, but the intra prediction mode is shared across all sub-partitions.

The VVC standard implements an MIP mode, a new intra prediction technique, as follows. For predicting the samples of a block of width W and height H, one line of H reconstructed neighboring boundary samples left of the block and one line of W reconstructed neighboring boundary samples above the block are used as input. The prediction signal is generated based from on three steps: a down-sampling of the reference samples, a matrix vector multiplication, and an up-sampling of the result by linear interpolation.

ECM further implements intra prediction modes beyond those provided by the VVC standard, including two luma intra prediction modes, Decoder-side intra mode derivation ("DIMD") mode and Template-based intra mode derivation ("TIMD") mode.

According to a DIMD proposal, two intra prediction modes from 65 angular modes are derived from the reconstructed neighbor samples, and those two predictors are combined with the Planar mode predictor with the weights derived from the gradients.

According to a TIMD proposal, for each intra prediction mode in a list, the SATD between the predicted and reconstructed samples of a template is computed. First, two intra prediction modes with the minimum SATD are selected; they are then fused with the weights derived from the SATD.

According to the VVC standard, the chroma components can be predicted by multiple intra prediction modes. These include three Cross Component Linear Model ("CCLM") modes, CCLM_LT, CCLM_L and CCLM_T; Direct Mode ("DM"); and four default intra prediction modes.

The VVC standard, to reduce cross-component redundancy, implements three CCLM prediction modes, for which the chroma components of a block can be predicted from the collocated reconstructed luma samples by linear models whose parameters are computed from already reconstructed luma and chroma samples that are adjacent to the block.

The VVC standard implements a DM mode, wherein an intra prediction mode of the corresponding luma block determines a chroma intra mode. If a corresponding luma block uses the Planar, DC or an angular mode, the same mode is used; if a corresponding luma block is coded using Intra Block Copy ("IBC") or Palette mode, the DC mode is used; and if a corresponding luma block is coded using Block DPCM ("BDPCM") mode, depending on the direction of the BDPCM, either the Horizontal or the Vertical intra prediction mode is used. Furthermore, if a corresponding luma block uses MIP, then, if the chroma color format is 4:4:4 and the single partitioning tree is applied, the same MIP mode is applied for the chroma block and otherwise, the Planar mode is applied.

For a B slice and a P slice, the corresponding luma block represents the luma block at the same position as the current chroma block. For an I slice, one chroma coding block may correspond to multiple luma coding blocks since the separate block partitioning structure for luma and chroma components is enabled.

Figure 3:
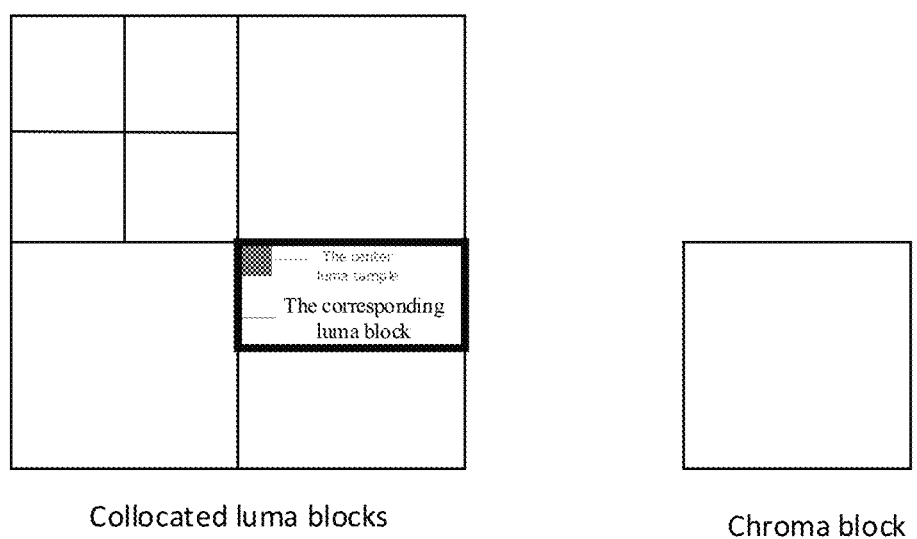
FIG. 3 illustrates a corresponding luma block to a current chroma block, the corresponding luma block representing the luma coding block containing the center position luma sample.

FIG. 3 illustrates a corresponding luma block to a current chroma block, the corresponding luma block representing the luma coding block containing the center position luma sample.

When the CCLM modes and DM mode are not used, the other four default non-DM modes are given by the list: {Planar mode, Vertical mode, Horizontal mode, DC mode}. In cases where the DM mode already belongs to that list, that is, the DM mode is the same as one of the four modes, then the mode in the list is replaced with an angular mode with a mode index of 66. It should be understood that a mode index refers to a unique number by which each intra prediction mode provided by the VVC standard is identified.

According to the VVC standard, in the signaling of the chroma intra mode, a flag cclm_mode_flag indicating whether CCLM is applied is signaled first. If the cclm_mode_flag is signaled as true, it is signaled which of the three CCLM modes is applied by an index cclm_mode_idx. In the non-CCLM case, a syntax intra_chroma_pred_mode is signaled to indicate which of the DM mode and the four default non-DM modes is applied. Binarization of intra_chroma_pred_mode and the corresponding chroma intra prediction modes according to the VVC specification is shown in Table 1 below.

| Value of intra_chroma_pred_mode | Bin string | Chroma intra prediction mode |
|---|---|---|
| 0 | 100 | list[0] |
| 1 | 101 | list[1] |
| 2 | 110 | list[2] |
| 3 | 111 | list[3] |
| 4 | 0 | DM mode |

As seen in the first four rows of Table 1, if DM mode is not used, an index in the range of 0 to 3 is binarized by two bits using a fixed length codeword to determine which of the four non-DM modes is to be used. To process the binary bits more efficiently, a first bit of intra_chroma_pred_mode can be regarded as a DM flag indicating whether DM mode is applied: when the first bit of intra_chroma_pred_mode is equal to 0, it means DM mode is applied, and when the first bit equal to 1, one of the four default non-DM modes is applied.

According to ECM, CCLM is extended over the VVC implementation thereof by the addition of three Multi-model LM ("MMLM") modes. In each MMLM mode, the reconstructed neighboring samples are classified into two classes using a threshold which is the average of the luma reconstructed neighboring samples. The linear model of each class is computed using the Least-Mean-Square ("LMS") method.

According to ECM, DIMD mode is provided as an alternative to the above-mentioned intra prediction modes. In contrast to the above-mentioned intra prediction modes, according to DIMD, the luma intra prediction mode is not transmitted via the bitstream; instead, an encoder and a decoder are configured to perform a texture gradient processing to derive two best modes, in a same fashion at the encoder side and at the decoder side. Then the predictors of the two derived modes and Planar mode are computed normally and their weighted average is used as the final predictor of the current block.

To determine whether an encoder and a decoder should use DIMD as an alternative intra prediction mode, a flag is signaled in the bitstream for each block to indicate whether to use DIMD mode or not. For a true flag value, the DIMD mode is used for the current block and the BDPCM flag, MIP flag, ISP flag and MRL index are inferred to be zero. In this case, the entire intra prediction mode parsing is also skipped. For a false flag value, the DIMD mode is not used for the current block and the parsing of the other intra modes from bitstream flags will continue normally.

To derive the two intra prediction modes and determine the weight of each mode, a VVC-standard encoder and a VVC-standard decoder configure one or more processors of a computing system to build a histogram by performing texture gradient processing.

Figure 4:
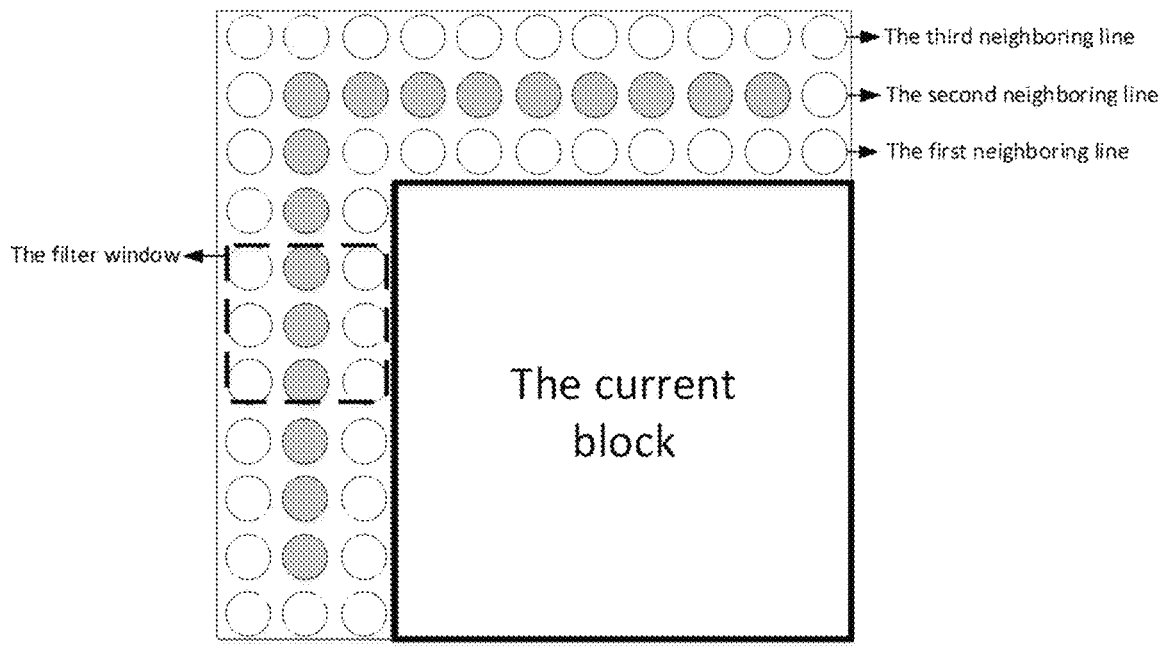
FIG. 4 illustrates samples of a second nearest neighboring line adjacent to an upper edge and a left edge of the block.

To build a DIMD histogram for a block, an encoder and a decoder perform gradient analysis on samples of a L-shaped template encompassing a second nearest neighboring line of samples adjacent to an upper edge and a left edge of the block. FIG. 4 illustrates samples of a second nearest neighboring line adjacent to an upper edge and a left edge of the block (as shaded circles). It should be understood that each circle represents a sample, and FIG. 4 does not imply that individual samples are geometrically circular in shape.

For each available reconstructed sample of the template, a horizontal gradient and a vertical gradient ("$G_x$" and "$G_y$") are computed by applying horizontal ("$F_{hor}$") and vertical Sobel filters ("$F_{ver}$") to samples within a filter window (a filter window encompassing a 3×3 block of samples as illustrated by broken lines in FIG. 4), by multiplying the samples of the filter window by the following matrices:

$$F_{hor} = \begin{bmatrix} 1 & 0 & -1 \\ 2 & 0 & -2 \\ 1 & 0 & -1 \end{bmatrix} \text{ and } F_{ver} = \begin{bmatrix} -1 & -2 & -1 \\ 0 & 0 & 0 \\ 1 & 2 & 1 \end{bmatrix}$$

For each sample in the template for which the horizontal gradient $G_x$ and the vertical gradient $G_y$ are computed, intensity ("G") and the orientation ("O") of the gradients are further computed using $G_x$ and $G_y$ by a following equation:

$$G = |G_x| + |G_y| \text{ and } O = \operatorname{atan}\left(\frac{G_y}{G_x}\right)$$

The orientation O of the gradients is then converted into the closest intra angular prediction mode, used to index a histogram. The encoder and the decoder first initialize the histogram at 0 for each value, then increase each histogram value by G for a respective intra angular prediction mode.

After each sample in the template is processed, the histogram may contain cumulative values of gradient intensities for each intra angular prediction mode. The encoder and the decoder select two modes having a largest and a second largest amplitude values for the following prediction fusion process (these modes being denoted as $M_1$ and $M_2$, respectively). In the event that a maximum amplitude value in the histogram is 0, a Planar mode, rather than any other mode, is selected as intra prediction mode for the current block.

According to DIMD, the encoder and the decoder combine two intra prediction angular modes corresponding to the largest histogram amplitude values, $M_1$ and $M_2$, with Planar mode to generate the final prediction values of the current block.

The prediction fusion is applied as a weighted average of the above three predictors, where each prediction mode can be weighted higher or lower relative to each other: herein, the weight of Planar mode is fixed to 21/64 (approximately equal to 1/3). The remaining weight of 43/64 (approximately equal to 2/3) is then shared between $M_1$ and $M_2$, in proportion to their amplitude values.

Figure 5:
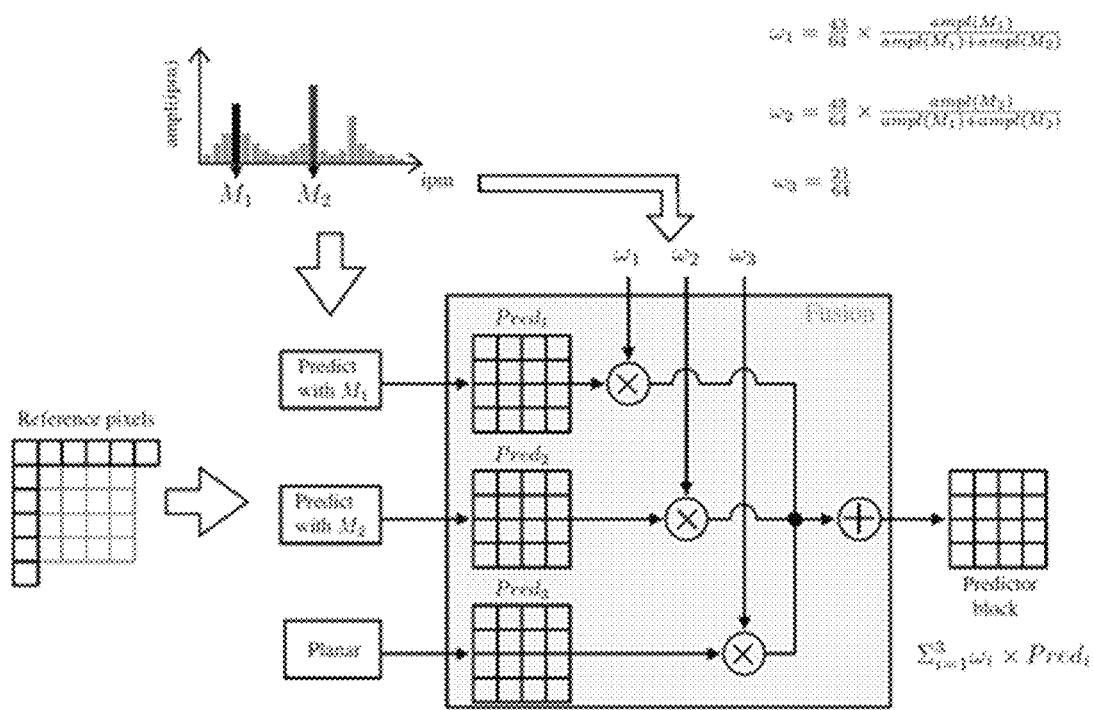
FIG. 5 illustrates a prediction blending process, wherein $ampl(M_1)$ and $ampl(M_2)$ represent amplitude values of $M_1$ and $M_2$, respectively.

FIG. 5 illustrates a prediction blending process, wherein ampl($M_1$) and ampl($M_2$) represent amplitude values of $M_1$ and $M_2$, respectively.

An encoder and a decoder under ECM only use DIMD mode for luma blocks. If an encoder and a decoder select DIMD mode for a current luma block, the intra prediction mode of the current block will be stored as $M_1$ for selection of the low-frequency non-separable transform ("LFNST") sets of the current block; derivation of the most probable modes ("MPM") list of the neighboring luma block; and derivation of the direct mode ("DM") of the collocated chroma block.

As mentioned above, ECM extends the functionality of angular intra prediction modes over the VVC standard. However, for a chroma block, only three angular modes are enabled, and two of them are fixed as horizontal mode and vertical mode. Generally speaking, enabling more angular modes for a chroma block can improve the prediction accuracy. However, considering that the greater the number of the angular modes enabled for a chroma block, the greater the bit overhead required, so that the overall BD-rate performance may not be better. A possible solution is to only add efficient angular modes, and the modes should be derived using the same method on the encoder side and the decoder side.

As mentioned above, ECM extends the VVC standard to provide more intra prediction modes. However, ECM provides more intra prediction modes available for luma blocks than chroma blocks, reducing accuracy of DM mode. For example, if the intra prediction mode of the corresponding luma block is not available for a chroma block (such as IBC, BDPCM or MIP mode), this mode will be mapped to one among Planar mode, DC mode, horizontal mode and vertical mode, and used for intra prediction of the chroma block, which may not suitable. Especially for I slices, DM mode is more inaccurate due to the use of separate block tree structure for luma and chroma. Since a chroma block may correspond to multiple luma blocks, and DM mode may only select the intra prediction mode of the luma block containing the center position luma sample, it is difficult to match the texture characteristics of the current chroma block for very small luma blocks.

Therefore, example embodiments of the present disclosure provide a decoder-side chroma intra prediction mode gradient-based derivation method, which improves coding efficiency of chroma intra prediction, thereby saving on signaling cost. A VVC-standard encoder and a VVC-standard decoder configure one or more processors of a computing system to derive one of multiple possible chroma intra prediction modes by computing gradients of adjacent luma samples and chroma samples of a current chroma block. Example embodiments of the present disclosure can be implemented alongside ECM's expansion of intra prediction modes, or can be implemented while omitting ECM's expansion of intra prediction modes. Similar to DIMD as described above, it should be understood that "decoder-side" does not mean that this method is implemented exclusively by decoders; rather, steps of this method can be implemented similarly or identically by encoders and decoders, as shall be described subsequently.

According to example embodiments of the present disclosure, a computing system includes at least one or more processors and a computer-readable storage medium communicatively coupled to the one or more processors. The computer-readable storage medium is a non-transient or non-transitory computer-readable storage medium, as defined subsequently with reference to FIG. 12, storing computer-readable instructions. At least some computer-readable instructions stored on a computer-readable storage medium are executable by one or more processors of a computing system to configure the one or more processors to perform associated operations of the computer-readable instructions, including at least operations of a VVC-standard encoder as defined above, and operations of a VVC-standard decoder as defined above. According to example embodiments of the present disclosure, a VVC-standard encoder and a VVC-standard decoder include computer-readable instructions stored on a computer-readable storage medium which are executable by one or more processors of a computing system to configure one or more processors of a computing system to derive a chroma intra prediction mode to be applied in reconstructing a current chroma block based on computing texture gradients of any, some, or all of: collocated reconstructed luma samples, collocated luma block-adjacent reconstructed luma samples, and adjacent reconstructed chroma samples.

In this fashion, a mode of intra prediction does not need to be coded and transmitted in a bitstream as described above, therefore reducing signaling cost in the coding process. Furthermore, both a VVC-standard encoder and a VVC-standard decoder can configure one or more processors of a computing system to derive a chroma intra prediction mode for a same block; derivation configured by an encoder and derivation configured by a decoder can yield a same mode or different modes for any given current chroma block.

While encoding or decoding a current chroma block, in accordance with raster scanning order, the collocated luma samples and the upper-adjacent and left-adjacent chroma samples have been encoded or decoded before the current chroma block, so the reconstructed values of these samples can be used by a VVC-standard encoder and a VVC-standard decoder configuring one or more processors of a computing system to derive the intra prediction mode of the current chroma block. However, it should be understood that such adjacent chroma samples are not necessarily available for every current chroma block: whether a sample is "available" according to example embodiments of the present disclosure shall be defined subsequently.

In the event that the current chroma block is at a boundary of a picture, slice, or tile, adjacent chroma samples on an entire side may not exist. Furthermore, even if upper-adjacent and left-adjacent chroma samples have been encoded or decoded before the current chroma block, right-adjacent and lower-adjacent chroma samples may not be encoded or decoded before the current coding block according to raster scanning order. Other possible coding orders may also change the availability of adjacent chroma samples at the entirety of a upper, left, right, or lower edge. Subsequently, the present disclosure will refer to nonexistent or non-encoded and non-decoded adjacent chroma samples along an entire edge as "not available."

A VVC-standard encoder and a VVC-standard decoder configure one or more processors of a computing system to perform a gradient-based derivation method as follows: for each reconstructed sample participating in the derivation, a horizontal gradient and a vertical gradient, $G_x$ and $G_y$, are computed by applying horizontal and vertical Sobel filters to samples of a filter window (as illustrated in FIG. 4 as discussed above), horizontal ("$F_{hor}$") and vertical Sobel filters ("$F_{ver}$") being applied by multiplying samples of the filter window by the following matrices:

$$F_{hor} = \begin{bmatrix} 1 & 0 & -1 \\ 2 & 0 & -2 \\ 1 & 0 & -1 \end{bmatrix} \text{ and } F_{ver} = \begin{bmatrix} -1 & -2 & -1 \\ 0 & 0 & 0 \\ 1 & 2 & 1 \end{bmatrix}$$

An intensity G and an orientation O of the gradients are further computed using $G_x$ and $G_y$ by a following equation:

$$G = |G_x| + |G_y| \text{ and } O = \operatorname{atan}\left(\frac{G_y}{G_x}\right)$$

Next, the VVC-standard encoder and the VVC-standard decoder configure one or more processors of a computing system to build an intra prediction mode histogram based on G and O, and, based on the computed gradients, select the intra prediction mode corresponding to the largest histogram amplitude value as the intra prediction mode of the current chroma block. The derived chroma intra prediction mode can be any one among Planar mode and 65 angular modes.

The samples participating in the gradient-based derivation of the chroma intra prediction mode can include collocated luma reconstructed samples, or collocated Y reconstructed samples for short; can include collocated luma block-adjacent reconstructed luma samples, collocated Y block-adjacent Y reconstructed samples for short; and can include adjacent Cb and Cr reconstructed samples. Collocated luma reconstructed samples can include the reconstructed samples from a collocated luma block 602 without the samples in an outermost edge, the reconstructed samples excluding the outermost edge being illustrated in FIG. 6A as shaded circles. Collocated luma block-adjacent luma reconstructed samples can include the reconstructed samples of a L-shaped template encompassing a second nearest neighboring line 608 adjacent to an upper edge of the collocated luma block 602 and adjacent to a left edge of the collocated luma block 602, illustrated in FIG. 6B as shaded circles. In other words, these reconstructed luma samples are adjacent to a collocated luma block 602, irrespective of whether the collocated luma block 602 itself has been reconstructed or not. Adjacent Cb and Cr reconstructed samples can include the reconstructed samples of a L-shaped template encompassing a second nearest neighboring line 608 adjacent to an upper edge of the current chroma block and adjacent to a left edge of the current chroma block (illustrated as the current Cb block 604 and the current Cr block 606), illustrated in FIGS. 6C and 6D, respectively, as shaded circles. It should be understood that each circle represents a sample, and FIGS. 6A, 6B, 6C, and 6D do not imply that individual samples are geometrically circular in shape.

It should be understood that an individual example embodiment of the present disclosure does not utilize all of the above reconstructed samples in deriving an intra prediction mode. Rather, according to different example embodiments of the present disclosure, different subsets of the reconstructed samples participate in decoder-side gradient-based chroma intra prediction mode derivation.

It should further be understood that "participate" refers to the VVC-standard encoder and the VVC-standard decoder configuring one or more processors of a computing system to perform the above-mentioned computations using certain participating samples, rather than the reconstructed samples themselves performing any step of the methods described herein.

According to one example embodiment, the VVC-standard encoder and the VVC-standard decoder configure one or more processors of a computing system to compute gradients of only the collocated reconstructed luma samples to derive the chroma intra prediction mode of the current chroma block 604 and 606; the derived chroma intra prediction mode is then used for both Cb and Cr blocks 604 and 606.

Figure 6A:
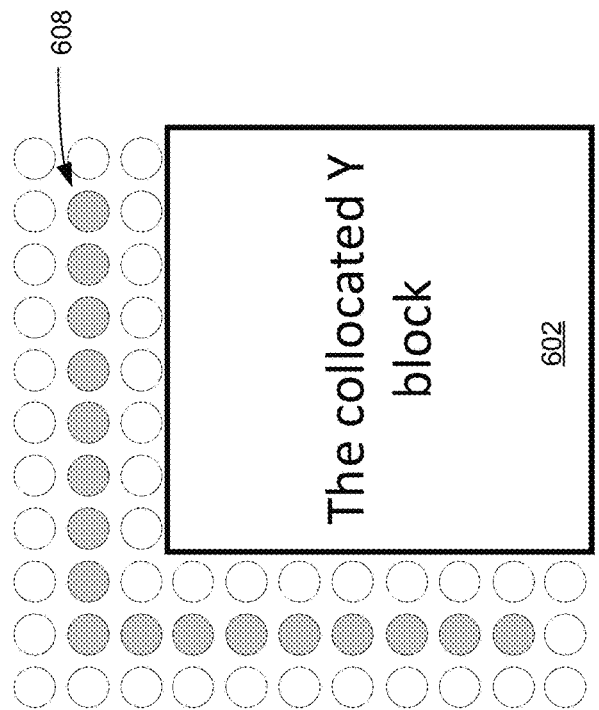
FIGS. 6A, 6B, 6C, and 6D illustrate example embodiments of the present disclosure wherein samples participating in the derivation of the chroma intra prediction mode can include collocated luma reconstructed samples, can include collocated luma block-adjacent reconstructed luma samples, and can include adjacent Cb and Cr reconstructed samples.

According to another example embodiment, the VVC-standard encoder and the VVC-standard decoder configure one or more processors of a computing system to compute gradients of reconstructed samples from the collocated luma block 602 without the samples in an outermost edge to derive the chroma intra prediction mode of the current chroma block 604 and 606, as illustrated by the shaded circles of FIG. 6A. It should be understood that FIG. 6A illustrates a pattern of samples, and a number of samples in accordance with the pattern can be more than or fewer than the number of samples illustrated.

By way of example, the VVC-standard encoder and the VVC-standard decoder configure one or more processors of a computing system to exclude reconstructed samples from the collocated luma block 602 from participation according to the availability of adjacent samples, leaving non-excluded reconstructed samples to participate in derive the chroma intra prediction mode of the current chroma block 604 and 606. If the upper-adjacent samples of the collocated luma block 602 are not available, the samples in the first row of the collocated luma block 602 are not used; if the left-adjacent samples of the collocated luma block 602 are not available, the samples in the first column of the collocated luma block 602 are not used; if the lower-adjacent samples of the collocated luma block 602 are not available, the samples in the last row of the collocated luma block 602 are not used; if the right-adjacent samples of the collocated luma block 602 are not available, the samples in the last column of the collocated luma block 602 are not used.

According to another example embodiment, the VVC-standard encoder and the VVC-standard decoder configure one or more processors of a computing system to compute gradients of only collocated luma block-adjacent reconstructed luma samples to derive the chroma intra prediction mode of the current chroma block 604 and 606. The derived chroma intra prediction mode is then applied in reconstructing both Cb and Cr blocks 604 and 606.

Figure 6B:
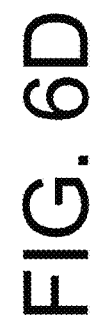

By way of example, the VVC-standard encoder and the VVC-standard decoder configure one or more processors of a computing system to compute gradients of the reconstructed luma samples of a L-shaped template encompassing a second nearest neighboring line 608 adjacent to an upper edge of the collocated luma block 602 and adjacent to a left edge of the collocated luma block 602 to derive the chroma intra prediction mode of the current chroma block 604 and 606. The samples used are illustrated by the pattern of the shaded circles as illustrated in FIG. 6B. It should be understood that FIG. 6B illustrates a pattern of samples, and a number of samples in accordance with the pattern can be more than or fewer than the number of samples illustrated.

Figure 7:
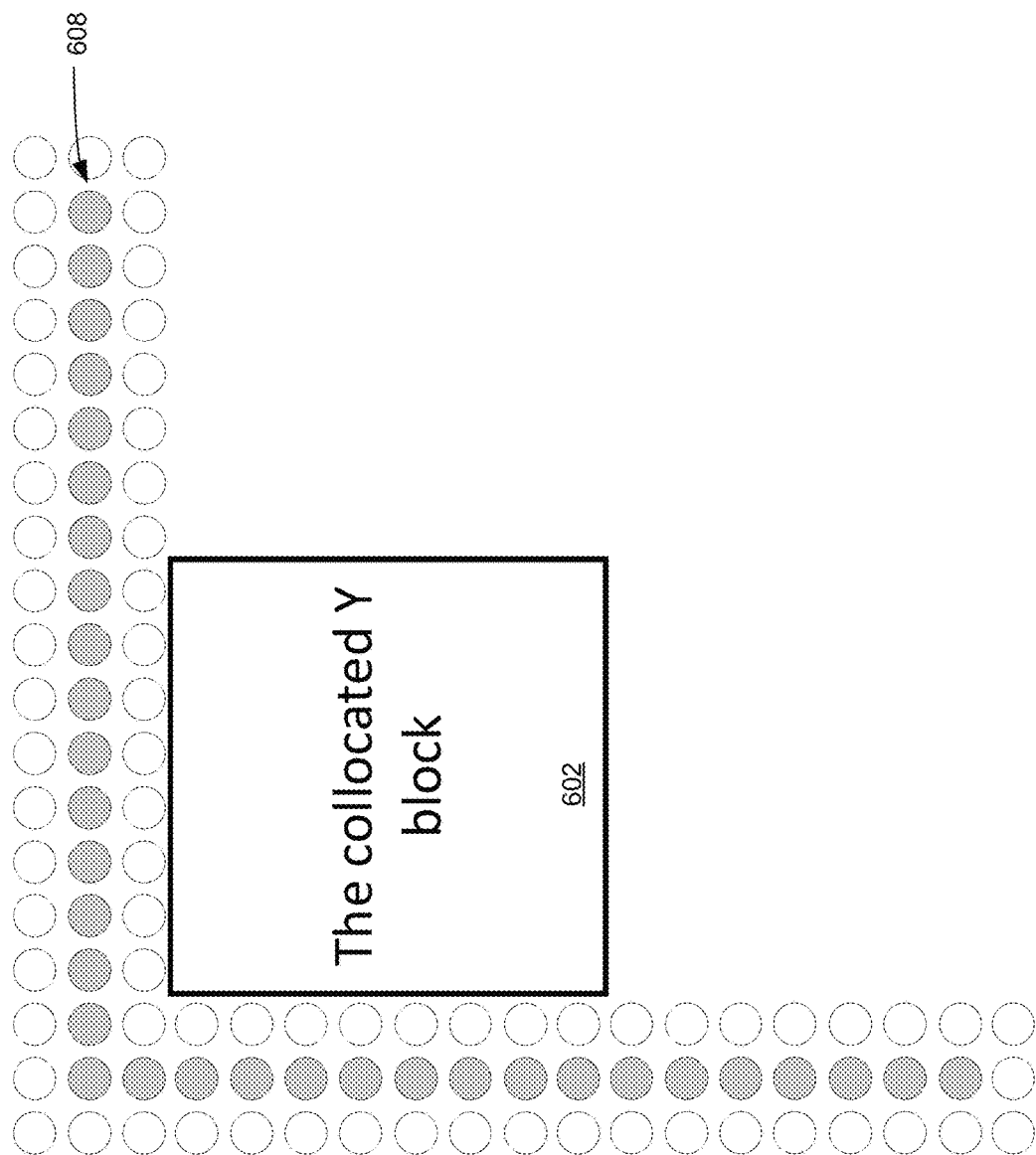
FIG. 7 illustrates example embodiments of the present disclosure wherein samples participating in the derivation of the chroma intra prediction mode include extended collocated luma block-adjacent reconstructed luma samples reconstructed luma samples.

By way of another example, the VVC-standard encoder and the VVC-standard decoder configure one or more processors of a computing system to compute gradients of extended collocated luma block-adjacent reconstructed luma samples to derive the chroma intra prediction mode of the current chroma block 604 and 606. In particular, gradients of the reconstructed samples of a L-shaped template encompassing the second nearest neighboring line 608 adjacent to an upper edge of the collocated luma block 602, adjacent to a left edge of the collocated luma block 602, to an upper-right of the collocated luma block 602, and to a lower-left of the collocated luma block 602 are computed to derive the chroma intra prediction mode of the current chroma block 604 and 606. The samples used are illustrated by the pattern of the shaded circles as illustrated in FIG. 7. For the purpose of understanding the present disclosure, "extended" should be understood as encompassing any, some, or all of the lower-left samples and/or the upper-right samples illustrated by the pattern of FIG. 7 and not illustrated by the pattern of FIG. 6B. It should be understood that FIG. 7 illustrates a pattern of samples, and a number of samples in accordance with the pattern can be more than or fewer than the number of samples illustrated.

According to another example embodiment, the VVC-standard encoder and the VVC-standard decoder configure one or more processors of a computing system to compute gradients of the collocated reconstructed luma samples and the collocated luma block-adjacent reconstructed luma samples reconstructed luma samples in conjunction to derive the chroma intra prediction mode of the current chroma block 604 and 606. The derived chroma intra prediction mode is then applied in reconstructing both Cb and Cr blocks 604 and 606.

Figure 8:
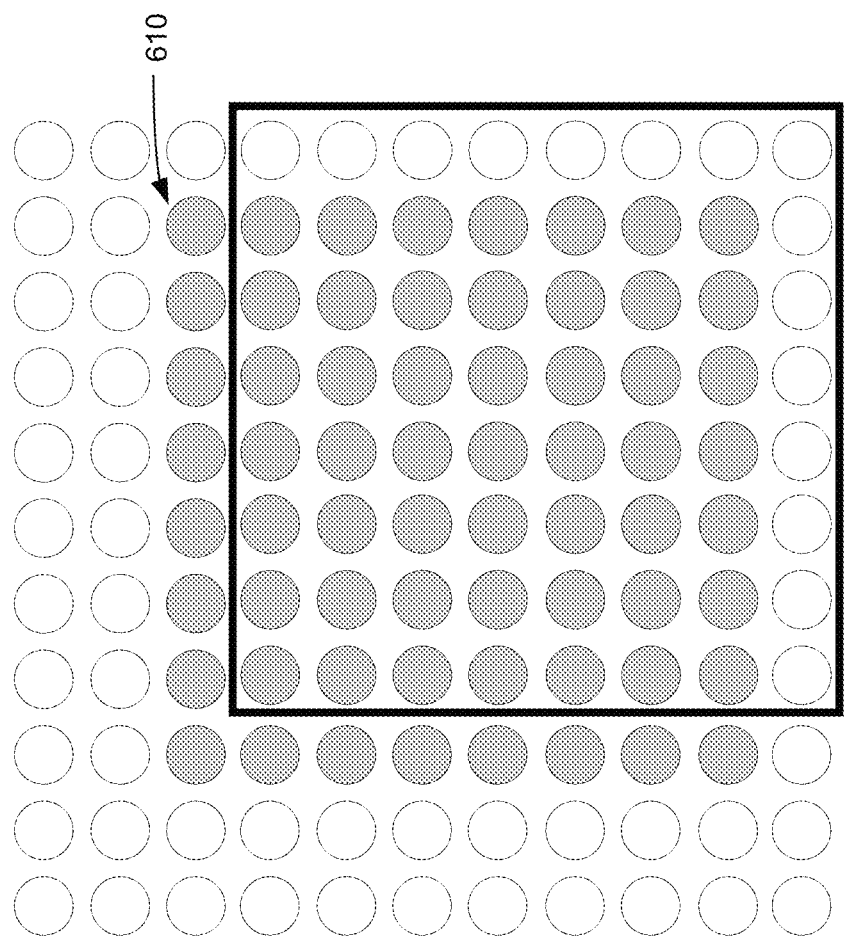
FIG. 8 illustrates example embodiments of the present disclosure wherein samples participating in the derivation of the chroma intra prediction mode include collocated reconstructed luma samples within the collocated reconstructed luma block and reconstructed samples of an L-shaped template of the first nearest neighboring line adjacent to an upper edge of the collocated luma block and adjacent to a left edge of the collocated luma block.

By way of example, gradients of the collocated reconstructed luma samples within the collocated reconstructed luma block 602 and the reconstructed samples of a L-shaped template encompassing the first nearest neighboring line 610 adjacent to an upper edge of the collocated luma block 602 and adjacent to a left edge of the collocated luma block 602 are computed, in conjunction, to derive the chroma intra prediction mode of the current chroma block 604 and 606. The samples used are illustrated by the pattern of the shaded circles as illustrated in FIG. 8. It should be understood that FIG. 8 illustrates a pattern of samples, and a number of samples in accordance with the pattern can be more than or fewer than the number of samples illustrated.

Figure 9:
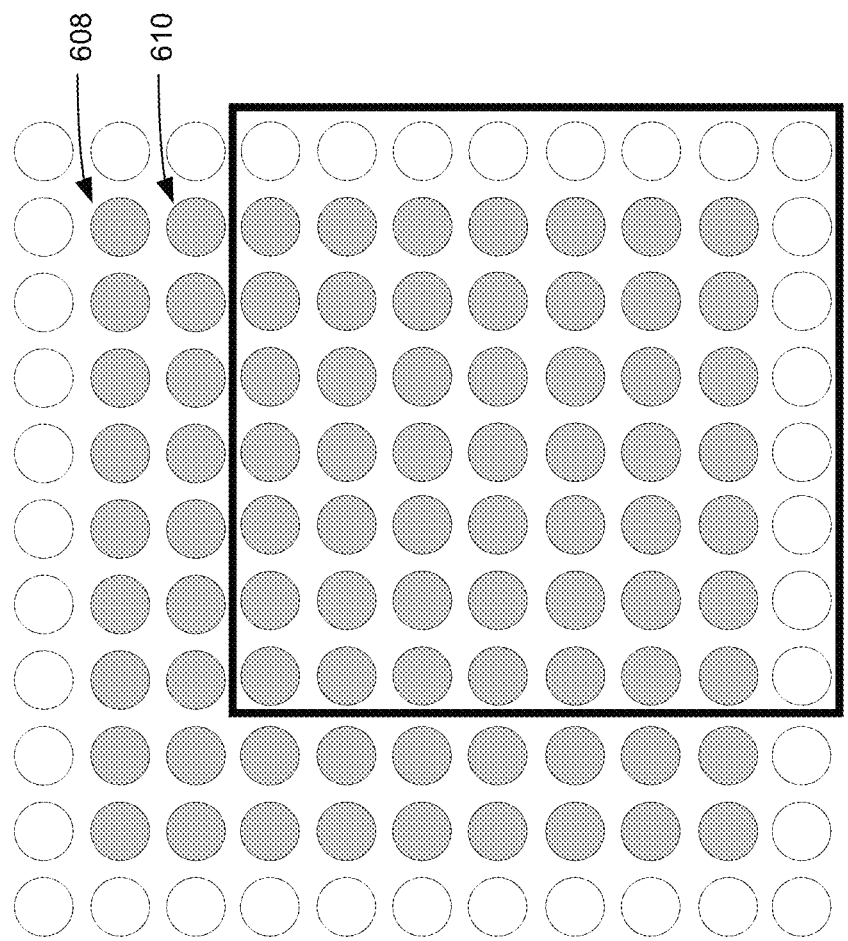
FIG. 9 illustrates example embodiments of the present disclosure wherein samples participating in the derivation of the chroma intra prediction mode include collocated reconstructed luma samples within the collocated reconstructed luma block and reconstructed samples of an L-shaped template of the first nearest and second nearest neighboring lines adjacent to an upper edge of the collocated luma block and adjacent to a left edge of the collocated luma block.

By way of another example, gradients of the collocated reconstructed luma samples within the collocated reconstructed luma block 602 and the reconstructed samples of a L-shaped template encompassing the first nearest neighboring line 610 and the second nearest neighboring line 608 adjacent to an upper edge of the collocated luma block 602 and adjacent to a left edge of the collocated luma block 602 are computed, in conjunction, to derive the chroma intra prediction mode of the current chroma block 604 and 606. The samples used are illustrated by the pattern of the shaded circles as illustrated in FIG. 9. It should be understood that FIG. 9 illustrates a pattern of samples, and a number of samples in accordance with the pattern can be more than or fewer than the number of samples illustrated.

According to another example embodiment, the VVC-standard encoder and the VVC-standard decoder configure one or more processors of a computing system to compute gradients of only the adjacent reconstructed Cb samples to derive the chroma intra prediction mode of the current chroma block 604 and 606. The samples used are illustrated by the pattern of the shaded circles as illustrated in FIG. 6B. It should be understood that FIG. 6B illustrates a pattern of samples, and a number of samples in accordance with the pattern can be more than or fewer than the number of samples illustrated. The derived chroma intra prediction mode is then applied in reconstructing both Cb and Cr blocks 604 and 606.

Figure 10:
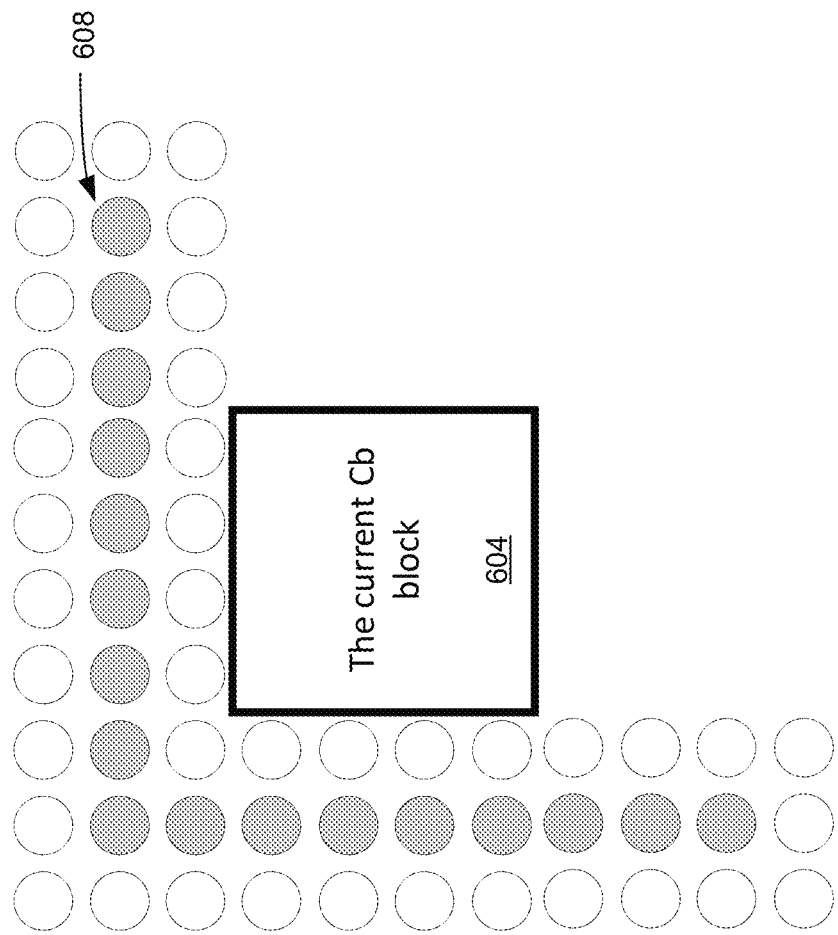
FIG. 10 illustrates example embodiments of the present disclosure wherein samples participating in the derivation of the chroma intra prediction mode include extended adjacent reconstructed Cb samples.

By way of example, gradients of the extended adjacent reconstructed Cb samples are computed to derive the chroma intra prediction mode of the current chroma block 604 and 606. In particular, gradients of reconstructed samples of a L-shaped template encompassing the second nearest neighboring line 608 adjacent to an upper edge of the current Cb block 604, adjacent to a left edge of the current Cb block 604, to an upper-right of the current Cb block 604, and to a lower-left of the current Cb block 604 are computed to derive the chroma intra prediction mode of the current chroma block 604 and 606. The samples used are illustrated by the pattern of the shaded circles as illustrated in FIG. 10. For the purpose of understanding the present disclosure, "extended" should be understood as encompassing any, some, or all of the lower-left samples and/or the upper-right samples illustrated by the pattern of FIG. 10 and not illustrated by the pattern of FIG. 6C. It should be understood that FIG. 10 illustrates a pattern of samples, and a number of samples in accordance with the pattern can be more than or fewer than the number of samples illustrated.

Figure 6C:
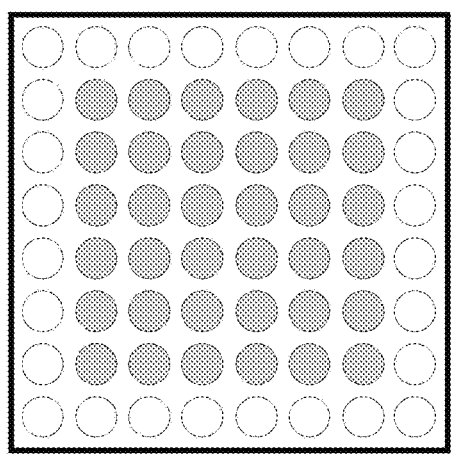

According to another example embodiment, the VVC-standard encoder and the VVC-standard decoder configure one or more processors of a computing system to compute gradients of only the adjacent reconstructed Cr samples to derive the chroma intra prediction mode of the current chroma block 604 and 606. The samples used are illustrated by the pattern of the shaded circles as illustrated in FIG. 6C. It should be understood that FIG. 6C illustrates a pattern of samples, and a number of samples in accordance with the pattern can be more than or fewer than the number of samples illustrated. The derived chroma intra prediction mode is then applied in reconstructing both Cb and Cr blocks 604 and 606.

Figure 11:
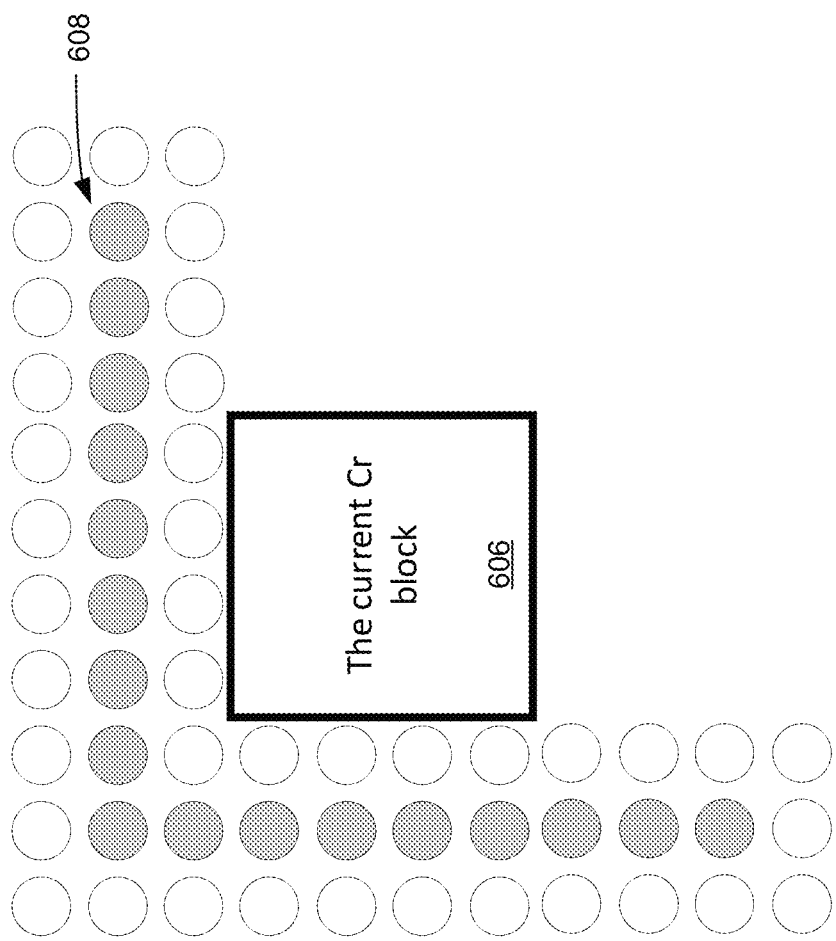
FIG. 11 illustrates example embodiments of the present disclosure wherein samples participating in the derivation of the chroma intra prediction mode include extended adjacent reconstructed Cr samples.

By way of example, gradients of the extended adjacent reconstructed Cr samples are computed to derive the chroma intra prediction mode of the current chroma block 604 and 606. In particular, the reconstructed samples of L-shaped template of the second nearest neighboring line 608 adjacent to an upper edge of the current Cr block 606, adjacent to a left edge of the current Cr block 606, to an upper-right of the current Cr block 606, and to a lower-left of the current Cr block 606 are used to derive the chroma intra prediction mode of the current chroma block 604 and 606. The samples used are illustrated by the pattern of the shaded circles as illustrated in FIG. 11. For the purpose of understanding the present disclosure, "extended" should be understood as encompassing any, some, or all of the lower-left samples and/or the upper-right samples illustrated by the pattern of FIG. 11 and not illustrated by the pattern of FIG. 6D. It should be understood that FIG. 11 illustrates a pattern of samples, and a number of samples in accordance with the pattern can be more than or fewer than the number of samples illustrated.

According to another example embodiment, the VVC-standard encoder and the VVC-standard decoder configure one or more processors of a computing system to compute gradients of both the adjacent reconstructed Cb samples and the adjacent reconstructed Cr samples to derive the chroma intra prediction mode of the current chroma block 604 and 606.

Figure 6D:
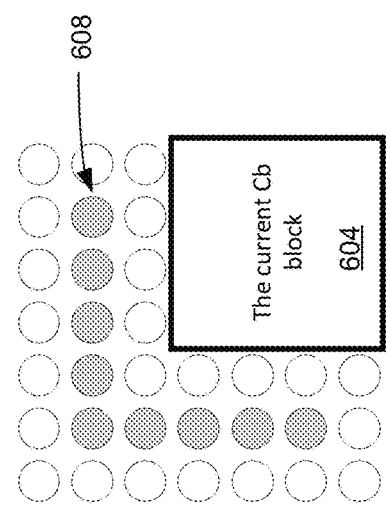

By way of example, the VVC-standard encoder and the VVC-standard decoder configure one or more processors of a computing system to compute gradients of the adjacent reconstructed Cb samples and the adjacent reconstructed Cr samples in conjunction to derive the chroma intra prediction mode for both Cb and Cr blocks 604 and 606. The samples used are illustrated by the pattern of the shaded circles as illustrated in FIGS. 6C and 6D. It should be understood that FIGS. 6C and 6D illustrate patterns of samples, and a number of samples in accordance with the patterns can be more than or fewer than the number of samples illustrated.

By way of another example, the VVC-standard encoder and the VVC-standard decoder configure one or more processors of a computing system to compute gradients of the extended adjacent reconstructed Cb samples and the extended adjacent reconstructed Cr samples in conjunction to derive the chroma intra prediction mode for both Cb and Cr blocks 604 and 606. The samples used are illustrated by the pattern of the shaded circles as illustrated in FIGS. 10 and 11. For the purpose of understanding the present disclosure, "extended" should be understood as encompassing any, some, or all of the lower-left samples and/or the upper-right samples illustrated by the pattern of FIGS. 10 and 11 and not illustrated by the pattern of FIGS. 6C and 6D. It should be understood that FIGS. 10 and 11 illustrate patterns of samples, and a number of samples in accordance with the patterns can be more than or fewer than the number of samples illustrated.

By way of another example, the VVC-standard encoder and the VVC-standard decoder configure one or more processors of a computing system to compute gradients of the adjacent reconstructed Cb samples to derive the chroma intra prediction mode for the current Cb block 604, and the adjacent reconstructed Cr samples to derive the chroma intra prediction mode for the current Cr block 606.

According to another example embodiment, the VVC-standard encoder and the VVC-standard decoder configure one or more processors of a computing system to compute gradients of the collocated reconstructed luma samples, the adjacent reconstructed Cb samples and the adjacent reconstructed Cr samples to derive the chroma intra prediction mode of the current chroma block.

By way of example, the VVC-standard encoder and the VVC-standard decoder configure one or more processors of a computing system to compute gradients of the collocated reconstructed luma samples, the adjacent reconstructed Cb samples and the adjacent reconstructed Cr samples together to derive the chroma intra prediction mode for Cb and Cr blocks 604 and 606. The samples used are illustrated by the pattern of the shaded circles as illustrated in FIGS. 6A, 6C, and 6D. It should be understood that FIGS. 6A, 6C, and 6D illustrate patterns of samples, and a number of samples in accordance with the patterns can be more than or fewer than the number of samples illustrated.

By way of another example, the VVC-standard encoder and the VVC-standard decoder configure one or more processors of a computing system to compute gradients of the collocated reconstructed luma samples, the adjacent reconstructed Cb samples and the adjacent reconstructed Cr samples to compute the histogram by a weighting method. Specifically, when constructing a histogram using Y samples, Cb samples and Cr samples, the decoder configures one or more processors of a computing system to multiply the computed histogram amplitude values by three weights, w_Y, w_Cb and w_Cr, respectively. Values of the three weights can be any non-negative values. For example, denoting the numbers of the Y, Cb and Cr samples used for deriving as, respectively, num_Y, num_Cb and num_Cr, then w_Y, w_Cb and w_Cr can have the values (num_Cb+num_Cr)/num_Y, 1, and 1, respectively.

By way of another example, the VVC-standard encoder and the VVC-standard decoder configure one or more processors of a computing system to compute gradients of the collocated reconstructed luma samples to derive a first chroma intra prediction mode, mode1; compute gradients of the adjacent reconstructed Cb samples to derive a second chroma intra prediction mode, mode2; and compute gradients of the adjacent reconstructed Cr samples to derive a third chroma intra prediction mode, mode3. Then, if two or three of these three modes are a mode in common, the decoder configures one or more processors of a computing system to apply the mode in common as the prediction mode in reconstructing the current Cb and Cr blocks 604 and 606; otherwise the decoder configures one or more processors of a computing system to apply mode1.

By way of another example, the VVC-standard encoder and the VVC-standard decoder configure one or more processors of a computing system to compute gradients of the collocated reconstructed luma samples and the adjacent reconstructed Cb samples to derive a chroma intra prediction mode for Cb block 604; and to compute gradients of the collocated reconstructed luma samples and the adjacent reconstructed Cr samples to derive a chroma intra prediction mode for Cr block 606.

According to another example embodiment, the VVC-standard encoder and the VVC-standard decoder configure one or more processors of a computing system to compute gradients of the collocated luma block-adjacent reconstructed luma samples, the adjacent reconstructed Cb samples, and compute gradients of the adjacent reconstructed Cr samples to derive the chroma intra prediction mode of the current chroma block 604 and 606.

By way of example, gradients of the collocated luma block-adjacent reconstructed luma samples, the adjacent reconstructed Cb samples, and the adjacent reconstructed Cr samples are computed in conjunction to derive the chroma intra prediction mode for Cb and Cr blocks 604 and 606. The samples used are illustrated by the pattern of the shaded circles as illustrated in FIGS. 6B, 6C, and 6D. It should be understood that FIGS. 6B, 6C, and 6D illustrate patterns of samples, and a number of samples in accordance with the patterns can be more than or fewer than the number of samples illustrated.

By way of another example, gradients of the collocated luma block-adjacent reconstructed luma samples and the adjacent reconstructed Cb samples are computed to derive a chroma intra prediction mode for the Cb block 604; and gradients of the collocated luma block-adjacent reconstructed luma samples and the adjacent reconstructed Cr samples are computed to derive a chroma intra prediction mode for the Cr block 606.

By way of another example, gradients of the extended adjacent reconstructed samples are computed to derive the chroma intra prediction mode of the current chroma block 604 and 606. "Extended" should be understood as described above with reference to FIGS. 7, 10, and 11.

According to another example embodiment, the VVC-standard encoder and the VVC-standard decoder configure one or more processors of a computing system to compute gradients of the collocated reconstructed luma samples, the collocated luma block-adjacent reconstructed luma samples, the adjacent reconstructed Cb samples and the adjacent reconstructed Cr samples to derive the chroma intra prediction mode of the current chroma block 604 and 606.

By way of example, the VVC-standard encoder and the VVC-standard decoder configure one or more processors of a computing system to perform down-sampling upon the above-mentioned samples to select a subset of the collocated reconstructed luma samples, the collocated luma block-adjacent reconstructed luma samples, the adjacent reconstructed Cb samples, and the adjacent reconstructed Cr samples to derive the chroma intra prediction mode. The down-sampling method can be different according to the block size. The samples used are illustrated by the pattern of the shaded circles as illustrated in FIGS. 6A, 6B, 6C, and 6D. It should be understood that FIGS. 6A, 6B, 6C, and 6D illustrate patterns of samples, and a number of samples in accordance with the patterns can be more than or fewer than the number of samples illustrated.

According to any, some, or all of the above-mentioned example embodiments wherein gradients of the adjacent reconstructed samples are computed to derive the chroma intra prediction mode, in the event that any adjacent reconstructed samples are not available, the VVC-standard encoder and the VVC-standard decoder configure one or more processors of a computing system to apply a default mode as the derived chroma intra prediction mode. By way of example, planar mode is applied as the derived chroma intra prediction mode.

According to various publications of the VVC standard, a line buffer is provided to store the reconstructed samples above a horizontal CTU boundary. Thus, according to any, some, or all of the above-mentioned example embodiments of deriving a chroma intra prediction mode, the VVC-standard encoder and the VVC-standard decoder configure one or more processors of a computing system to, for reconstructed samples above a horizontal CTU boundary, compute gradients of only the first n rows of the adjacent reconstructed samples to derive the chroma intra prediction mode, wherein n is equal to the number of rows stored in the line buffer. In this fashion, example embodiments of the present disclosure avoid growing the line buffer.

According to any, some, or all of the above-mentioned example embodiments of deriving a chroma intra prediction mode, a collocated luma block 602 refers to a luma block at the same position as the current chroma block 604 and 606. For 4:2:0 format pictures, the width and height of the collocated luma block 602 are respectively twice the width and height of the current chroma block 604 and 606. For B slices and P slices, the collocated luma block 602 and the current chroma block 604 and 606 refers to the same CU. For an I slice, denoting the coordinates of the upper-left sample in the current chroma block 604 and 606 as (x, y) and the width and height of the current chroma block 604 and 606 as W and H, the collocated luma block 602 can be defined as a block composed of luma samples within a block with a width of 2 W and a height of 2H from the luma sample with coordinates (2x, 2y), and such a block may contain one or more CUs.

Furthermore, according to any, some, or all of the above-mentioned example embodiments of deriving a chroma intra prediction mode, the collocated luma samples used for deriving chroma intra prediction mode can be luma samples within a block with a width of 2 W and a height of 2H from the luma sample with coordinates (2x+shift$_x$, 2y+shift$_y$), where shift$_y$ and shift$_y$ can be any integer values.

Subsequently, gradient-based derivation of the chroma intra prediction mode according to example embodiments of the present disclosure is described in further detail. It should be understood that such derivation based on the gradients of the corresponding samples differs from the aforementioned DIMD derivation method according to the VVC standard.

According to an example embodiment, a VVC-standard encoder and a VVC-standard decoder configure one or more processors of a computing system to apply at least a filter other than Sobel filters in computing gradients using the corresponding samples of a filter window by multiplying samples of the filter window by at least one of the following matrices other than a Sobel filter.

A filter applied to compute the horizontal and vertical gradients can include either pair of matrices as shown below, where a and b can be any integer values.

$$F_{hor} = \begin{bmatrix} a & 0 & -a \\ b & 0 & -b \\ a & 0 & -a \end{bmatrix} \text{ and } F_{ver} = \begin{bmatrix} -a & -b & -a \\ 0 & 0 & 0 \\ a & b & a \end{bmatrix}$$

$$F_{hor} = \begin{bmatrix} 0 & 0 & 0 \\ a & b & a \\ 0 & 0 & 0 \end{bmatrix} \text{ and } F_{ver} = \begin{bmatrix} 0 & a & 0 \\ 0 & b & 0 \\ 0 & a & 0 \end{bmatrix}$$

Furthermore, according to example embodiments of the present disclosure, the VVC-standard encoder and the VVC-standard decoder configure one or more processors of a computing system to derive multiple, rather than one, chroma intra prediction modes for fusion. The VVC-standard encoder and the VVC-standard decoder configure one or more processors of a computing system to, based on the computed gradients, select n intra prediction angular modes corresponding to the n largest histogram amplitude values, namely $M_1, M_2 \ldots, M_n$. The VVC-standard encoder and the VVC-standard decoder configure one or more processors of a computing system to fuse the n modes to generate a fused predictor of the current chroma block 604 and 606. The VVC-standard encoder and the VVC-standard decoder configure one or more processors of a computing system to furthermore fuse the n modes additionally with Planar mode to generate a fused predictor of the current chroma block 604 and 606. The weights for the n modes can be set proportional to respective amplitude values corresponding to those modes at the histogram.

Furthermore, according to example embodiments of the present disclosure, the VVC-standard encoder and the VVC-standard decoder configure one or more processors of a computing system to further implement a mode flag replacement method, addressing conflicts resulting in the event that the derived chroma intra prediction mode is the same as the DM mode of the VVC standard, or is the same as one of the four default non-DM modes of the VVC standard.

According to one example embodiment, in the event that the derived chroma intra prediction mode is the same as the DM mode, the VVC-standard encoder and the VVC-standard decoder configure one or more processors of a computing system to determine that the intra prediction mode corresponding to the largest histogram amplitude value is DM mode, and select a chroma intra prediction mode corresponding to a second largest histogram amplitude value from the intra prediction mode histogram.

According to another example embodiment, in the event that the derived chroma intra prediction mode is the same as one of the four default non-DM modes, the VVC-standard encoder and the VVC-standard decoder configure one or more processors of a computing system to replace the default mode in the list with another mode (e.g., intra prediction mode 34 as provided by the VVC standard).

Furthermore, according to example embodiments of the present disclosure, a VVC-standard encoder configures one or more processors of a computing system to implement signaling, in a bitstream, to a VVC-standard decoder whether the decoder should apply a chroma intra prediction mode which is gradient-based derived according to any of the above-mentioned embodiments, or should apply another intra prediction mode. Signaling in the bitstream is performed by writing a mode decision flag, as shall be subsequently described, into a bitstream. The bitstream, including the mode decision flag, is written by one or more processors of a computing system to a non-transient or non-transitory computer-readable storage medium of the computing system, for transmission.

According to an example embodiment, the VVC-standard decoder configures one or more processors of a computing system to apply a gradient-based derived chroma intra prediction mode in place of DM mode; the encoder's signaling, in a bitstream, of DM mode is repurposed, and no further signaling is needed.

According to an example embodiment, the VVC-standard encoder configures one or more processors of a computing system to set a mode decision flag to signal, in a bitstream, whether to use the gradient-based derived chroma intra prediction mode as an chroma intra prediction mode, alongside possible flags to signal the use of other intra prediction modes. The VVC-standard decoder configures one or more processors of a computing system to parse, from a bitstream, the mode decision flag before deriving a chroma intra prediction mode, and to parse, from the bitstream, flags which signal the use of other intra prediction modes.

According to one example embodiment, the VVC-standard encoder configures one or more processors of a computing system to signal a first flag in a bitstream, the first flag being a mode decision flag indicating whether to apply, by one or more processors of a computing system configured by an entropy decoder, a gradient-based derived decoder-side chroma intra prediction mode to the current chroma block 604 and 606, and the first flag being before a second flag in the bitstream, the second flag being a DM flag indicating whether to apply, by the one or more processors of a computing system configured by the entropy decoder, DM mode to the current chroma block 604 and 606. Accordingly, binarization of intra_chroma_pred_mode can be extended as shown in Table 2 below to indicate which among the gradient-based derived chroma intra prediction mode, DM mode, and the four default modes is applied by the decoder. In Table 2, the first bit of each bin string is a mode decision flag according to example embodiments of the present disclosure.

| Value of intra_chroma_pred_mode | Bin string | Chroma intra prediction mode |
|---|---|---|
| 0 | 1100 | list[0] |
| 1 | 1101 | list[1] |
| 2 | 1110 | list[2] |
| 3 | 1111 | list[3] |
| 4 | 10 | DM mode |
| 5 | 0 | Gradient-based derived chroma intra prediction mode |

A first bit of intra_chroma_pred_mode flags to the decoder whether the gradient-based derived chroma intra prediction is applied (i.e., only if the first bit is 0). For those strings where the first bit is 1, the second bit of intra_chroma_pred_mode flags to the decoder whether the DM mode is applied (i.e., only if the second bit is 0). For those strings where the first bit is 1 and the second bit is also 1, an index in the range of 0 to 3 is binarized by two bits using a fixed length codeword to determine which of the four default modes is applied.

Therefore, the VVC-standard decoder configures one or more processors of a computing system to parse the first flag signaled in a bitstream, where the first flag indicates whether to apply, by one or more processors of a computing system configured by an entropy decoder, a gradient-based derived decoder-side chroma intra prediction mode to the current chroma block 604 and 606. The VVC-standard decoder then configures one or more processors of a computing system to deriving a chroma intra prediction mode to be applied in reconstructing a current chroma block based on computing gradients in the event that the first flag signals a true value. In the event that the first flag signals a false value, the VVC-standard decoder configures one or more processors of a computing system to parse the second flag signaled in a bitstream in accordance with the VVC standard.

According to another example, the VVC-standard encoder configures one or more processors of a computing system to signal a first flag in a bitstream, the first flag being a mode decision flag indicating whether to apply, by one or more processors of a computing system configured by an entropy decoder, the gradient-based derived chroma intra prediction mode to the current chroma block 604 and 606, and the first flag being after a second flag in the bitstream, the second flag being a DM flag indicating whether to apply DM mode, by the one or more processors of a computing system configured by the entropy decoder, to the current chroma block 604 and 606. Accordingly, binarization of intra_chroma_pred_mode can be extended as shown in Table 3 below to indicate which among the gradient-based derived chroma intra prediction mode, DM mode and the four default modes is applied by the decoder. In Table 3, the second bit of each bin string is a mode decision flag according to example embodiments of the present disclosure; for bin strings starting with 0, the mode decision flag is not present.

| Value of intra_chroma_pred_mode | Bin string | Chroma intra prediction mode |
|---|---|---|
| 0 | 1100 | list[0] |
| 1 | 1101 | list[1] |
| 2 | 1110 | list[2] |
| 3 | 1111 | list[3] |
| 4 | 10 | Gradient-based derived chroma intra prediction mode |
| 5 | 0 | DM mode |

A first bit of intra_chroma_pred_mode flags to the decoder whether the DM mode is applied (i.e., only if the first bit is 0); in other words, where the second flag is set to a true value, the first flag is not signaled in the bitstream. For those strings where the first bit is 1, the second bit of intra_chroma_pred_mode flags to the decoder whether the gradient-based derived chroma intra prediction is applied (i.e., only if the second bit is 0); in other words, where the second flag is set to a false value, the first flag is flagged in the bitstream as either true or false. For those strings where the first bit is 1 and the second bit is also 1, an index in the range of 0 to 3 is binarized by two bits using a fixed length codeword to determine which of the four default modes is applied.

Therefore, the VVC-standard decoder configures one or more processors of a computing system to parse the second flag signaled in a bitstream in accordance with the VVC standard. In the event that the second flag signals a false value, the VVC-standard decoder configures one or more processors of a computing system to parse the first flag signaled in a bitstream, where the first flag indicates whether to apply, by one or more processors of a computing system configured by an entropy decoder, a gradient-based derived decoder-side chroma intra prediction mode to the current chroma block 604 and 606. The VVC-standard decoder then configures one or more processors of a computing system to deriving a chroma intra prediction mode to be applied in reconstructing a current chroma block based on computing gradients in the event that the first flag signals a true value.

According to another example, the VVC-standard encoder configures one or more processors of a computing system to signal a flag in a bitstream, the flag being a mode decision flag indicating whether to apply either or neither of the gradient-based derived chroma intra prediction mode and the DM mode, by the one or more processors, to the current chroma block. Accordingly, binarization of intra_chroma_pred_mode can be extended as shown in Table 4 below to indicate which among the gradient-based derived chroma intra prediction mode, DM mode and the four default modes is applied to the current chroma block 604 and 606. In Table 4, the first bit of each bin string is a mode decision flag according to example embodiments of the present disclosure. In Table 4, the second bit of each bin string starting with 0 is an index indicating which, between the DM mode and the gradient-based derived chroma intra prediction mode, is to be applied; for bin strings starting with 1, the second bit is an index indicating which, among the four default modes, is to be applied.

| Value of intra_chroma_pred_mode | Bin string | Chroma intra prediction mode |
|---|---|---|
| 0 | 100 | list[0] |
| 1 | 101 | list[1] |
| 2 | 110 | list[2] |
| 3 | 111 | list[3] |
| 4 | 00 | DM mode |
| 5 | 01 | Gradient-based derived chroma intra prediction mode |

A first bit of intra_chroma_pred_mode flags to the decoder whether to apply either or neither of the DM mode or the gradient-based derived chroma intra prediction mode, by the one or more processors, to the current chroma block. For those strings where the first bit is 0, an index at the second bit is further signaled to indicate which, between the DM mode and the gradient-based derived chroma intra prediction mode, is to be applied. For those strings where the first bit is 1, an index in the range of 0 to 3 is binarized by two bits at the second bit and the third bit using a fixed length codeword to determine which of the four default modes is to be applied.

Therefore, the VVC-standard decoder configures one or more processors of a computing system to parse the flag signaled in a bitstream. In the event that the second flag signals a true value, the VVC-standard decoder configures one or more processors of a computing system to parse the next bit in a bitstream following the flag, where the second bit indicates which, between DM mode and a gradient-based derived decoder-side chroma intra prediction mode, to apply, by one or more processors of a computing system configured by an entropy decoder, to the current chroma block 604 and 606. In the event that the second flag signals a false value, the VVC-standard decoder configures one or more processors of a computing system to parse the next two bits in a bitstream following the flag, where the next two bits indicate which, among the four default modes, to apply, by one or more processors of a computing system configured by an entropy decoder, to the current chroma block 604 and 606.

The above descriptions are written such that flag values of 0 denote "true," while flag values of 1 denote "false." According to other embodiments, flag values of 1 denote "true," while flag values of 0 denote "false," and each bit of the second columns of Tables 2, 3, and 4 would be flipped according to such embodiments.

Thus, according to example embodiments of the present disclosure, with minimal increase in signaling cost, the VVC-standard coding and decoding processes are enhanced to base intra prediction modes for chroma blocks on collocated luma block-adjacent reconstructed luma samples adjacent reconstructed chroma samples, enabling prior computational work done on coding and decoding adjacent blocks to be referenced. In this fashion, coding gains can be achieved in matching texture characteristics of the current chroma block based on a texture gradient including adjacent blocks.

Persons skilled in the art will appreciate that all of the above aspects of the present disclosure may be implemented concurrently in any combination thereof, and all aspects of the present disclosure may be implemented in combination as yet another embodiment of the present disclosure.

Figure 12:
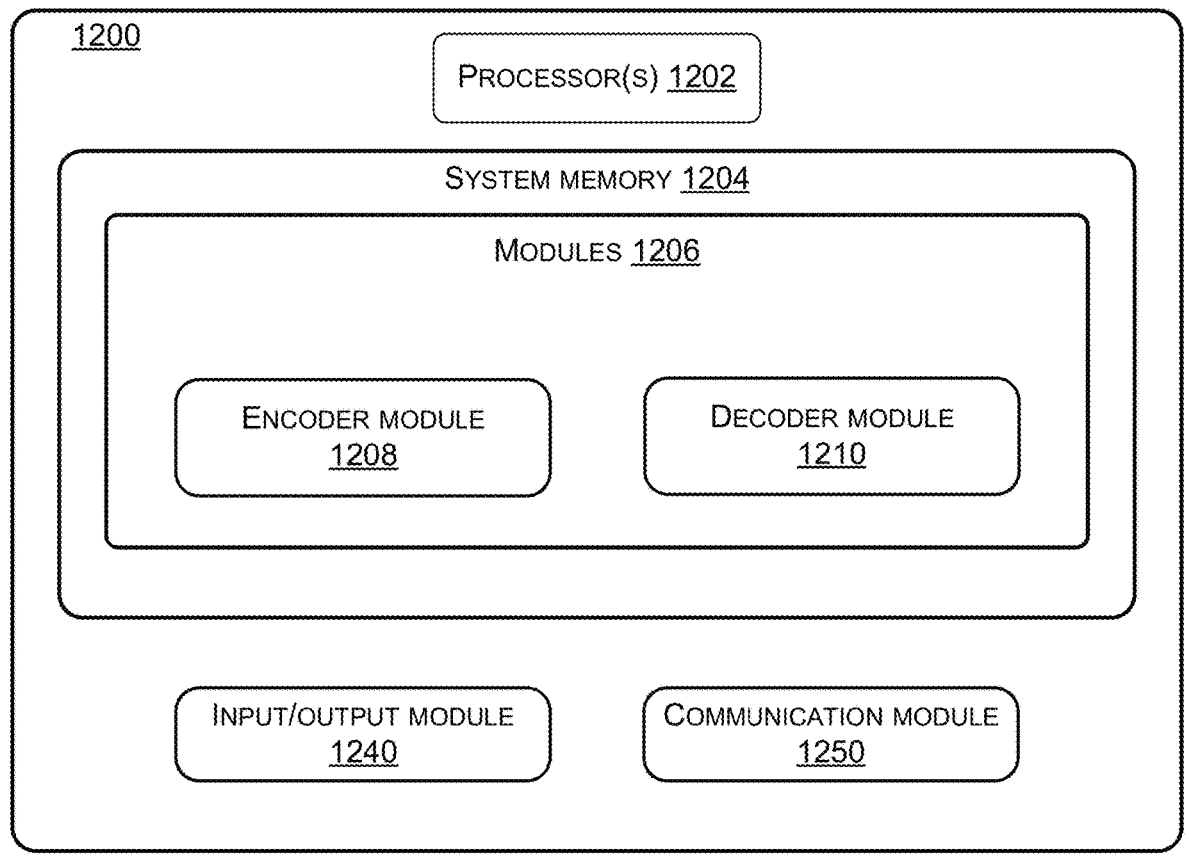
FIG. 12 illustrates an example system for implementing the processes and methods described herein for implementing a decoder-side chroma intra prediction mode.

FIG. 12 illustrates an example system 1200 for implementing the processes and methods described above for implementing residual sign prediction.

The techniques and mechanisms described herein may be implemented by multiple instances of the system 1200 as well as by any other computing device, system, and/or environment. The system 1200 shown in FIG. 12 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 1200 may include one or more processors 1202 and system memory 1204 communicatively coupled to the processor(s) 1202. The processor(s) 1202 may execute one or more modules and/or processes to cause the processor(s) 1202 to perform a variety of functions. In some embodiments, the processor(s) 1202 may include a central processing unit ("CPU"), a graphics processing unit ("GPU"), both CPU and GPU, or other processing units or components known in the art. Additionally, each of the processor(s) 1202 may possess its own local memory, which also may store program modules, program data, and/or one or more operating systems.

Depending on the exact configuration and type of the system 1200, the system memory 1204 may be volatile, such as RAM, non-volatile, such as ROM, flash memory, miniature hard drive, memory card, and the like, or some combination thereof. The system memory 1204 may include one or more computer-executable modules 1206 that are executable by the processor(s) 1202.

The modules 1206 may include, but are not limited to, one or more of an encoder 1208 and a decoder 1210.

The encoder 1208 may be a VVC-standard encoder implementing any, some, or all aspects of example embodiments of the present disclosure as described above, and executable by the processor(s) 1202 to configure the processor(s) 1202 to perform operations as described above.

The decoder 1210 may be a VVC-standard encoder implementing any, some, or all aspects of example embodiments of the present disclosure as described above, executable by the processor(s) 1202 to configure the processor(s) 1202 to perform operations as described above.

The system 1200 may additionally include an input/output (I/O) interface 1240 for receiving image source data and bitstream data, and for outputting reconstructed pictures into a reference picture buffer or DPB and/or a display buffer. The system 1200 may also include a communication module 1250 allowing the system 1200 to communicate with other devices (not shown) over a network (not shown). The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient or non-transitory computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. A computer-readable storage medium employed herein shall not be interpreted as a transitory signal itself, such as a radio wave or other free-propagating electromagnetic wave, electromagnetic waves propagating through a waveguide or other transmission medium (such as light pulses through a fiber optic cable), or electrical signals propagating through a wire.

The computer-readable instructions stored on one or more non-transient or non-transitory computer-readable storage media that, when executed by one or more processors, may perform operations described above with reference to FIGS. 1A-11. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system, comprising:
   one or more processors, and
   a computer-readable storage medium communicatively coupled to the one or more processors, the computer-readable storage medium storing computer-readable instructions executable by the one or more processors that, when executed by the one or more processors, perform associated operations comprising:
      signaling a first flag in a bitstream, the first flag indicating whether to apply, by one or more processors of a computing system configured by an entropy decoder, a gradient-based derived chroma intra prediction mode to a current chroma block;
      signaling a second flag in the bitstream, the second flag indicating whether to apply, by the one or more processors configured by an entropy decoder, Direct Mode ("DM") mode to the current chroma block;
      wherein the first flag is after the second flag in the bitstream.

2. The computing system of claim 1, wherein the second flag is set to a false value.

3. A computing system, comprising:
   one or more processors, and
   a computer-readable storage medium communicatively coupled to the one or more processors, the computer-readable storage medium storing computer-readable instructions executable by the one or more processors that, when executed by the one or more processors, perform associated operations comprising:
      deriving a chroma intra prediction mode to be applied in reconstructing a current chroma block based on computing gradients of:
         a plurality of collocated reconstructed luma samples;
         a plurality of collocated luma block-adjacent reconstructed luma samples; and
         a plurality of adjacent reconstructed chroma samples consisting of samples of a second nearest neighboring line adjacent to an upper edge of the current chroma block and adjacent to a left edge of the current chroma block.

4. The computing system of claim 3, wherein computing gradients comprises multiplying samples of a filter window by at least a matrix other than a Sobel filter.

5. The computing system of claim 3, wherein deriving a chroma intra prediction mode comprises selecting an intra prediction mode corresponding to a largest histogram amplitude value from an intra prediction mode histogram based on computed gradients.

6. The computing system of claim 5, wherein deriving a chroma intra prediction mode further comprises:
   determining that the intra prediction mode corresponding to a largest histogram amplitude value is Direct Mode ("DM"); and
   selecting an intra prediction mode corresponding to a second largest histogram amplitude value from an intra prediction mode histogram based on computed gradients.

7. The computing system of claim 3, wherein the chroma intra prediction mode is derived based on computing gradients of only the plurality of collocated reconstructed luma samples.

8. The computing system of claim 3, wherein the chroma intra prediction mode is derived based on computing gradients of the plurality of collocated luma block-adjacent reconstructed luma samples and the plurality of adjacent reconstructed chroma samples;
wherein the plurality of adjacent reconstructed chroma samples comprises reconstructed Cb samples and reconstructed Cr samples.

9. The computing system of claim 8, wherein the chroma intra prediction mode is derived based further on computing gradients of the plurality of collocated reconstructed luma samples.

10. The computing system of claim 3, wherein the samples of the second nearest neighboring line comprise extended samples to an upper-right of the current chroma block and extended samples to a lower-left of the current chroma block.

11. The computing system of claim 3, wherein the operations further comprise:
parsing a first flag signaled in a bitstream before deriving the chroma intra prediction mode;
wherein the first flag indicates either:
to apply a gradient-based derived chroma intra prediction mode to the current chroma block; or
to apply one among the gradient-based derived chroma intra prediction mode or Direct Mode ("DM") mode to the current chroma block.

12. The computing system of claim 11, wherein the operations further comprise parsing a second flag signaled in the bitstream before deriving the chroma intra prediction mode;
wherein the first flag indicates to apply a gradient-based derived chroma intra prediction mode to a current chroma block; and
wherein the second flag indicates not to apply DM mode to the current chroma block.

13. The computing system of claim 12, wherein the first flag is after the second flag in the bitstream.

14. A method of storing a bitstream associated with a video sequence, the method comprising:
generating a bitstream comprising:
a first flag indicating whether to apply, by one or more processors of a computing system configured by an entropy decoder, a gradient-based derived chroma intra prediction mode to a current chroma block; and
a second flag indicating whether to apply, by the one or more processors, Direct Mode ("DM") mode to the current chroma block;
wherein the first flag is after the second flag in the bitstream; and
storing the bitstream in a non-transitory computer-readable storage medium.

15. The method of claim 14, wherein the first flag indicates whether to apply, by the one or more processors, a gradient-based derived chroma intra prediction mode to a current chroma block; and
wherein the first flag is signaled in the bitstream after a second flag, the second flag indicating whether to apply, by the one or more processors, DM mode to the current chroma block.

16. The method of claim 15, wherein the second flag is set to a false value.

17. The method of claim 14, wherein the first flag is signaled in the bitstream before a second flag, the second flag indicating whether to apply, by the one or more processors, DM mode to the current chroma block.

18. The method of claim 14, wherein the first flag indicates which, between the gradient-based derived chroma intra prediction mode and DM mode, to the current chroma block; and wherein the first flag is signaled in the bitstream after a second flag, the second flag indicating whether to apply either or neither of the gradient-based derived chroma intra prediction mode and DM mode, by the one or more processors, to the current chroma block.

* * * * *